US009113241B2

(12) United States Patent
Osako et al.

(10) Patent No.: US 9,113,241 B2
(45) Date of Patent: Aug. 18, 2015

(54) NOISE REMOVING APPARATUS AND NOISE REMOVING METHOD

(75) Inventors: Keiichi Osako, Tokyo (JP); Toshiyuki Sekiya, Kanagawa (JP); Ryuichi Namba, Tokyo (JP); Mototsugu Abe, Kanagawa (JP)

(73) Assignee: Sony Corporation (JP)

( * ) Notice: Subject to any disclaimer, the term of this patent is extended or adjusted under 35 U.S.C. 154(b) by 1020 days.

(21) Appl. No.: 13/224,383

(22) Filed: Sep. 2, 2011

(65) Prior Publication Data

US 2012/0057722 A1 Mar. 8, 2012

(30) Foreign Application Priority Data

Sep. 7, 2010 (JP) ................................ P2010-199517

(51) Int. Cl.
*H04B 15/00* (2006.01)
*H04R 3/00* (2006.01)
*G10L 21/0208* (2013.01)
*G10L 21/0232* (2013.01)

(52) U.S. Cl.
CPC ............ *H04R 3/005* (2013.01); *G10L 21/0208* (2013.01); *G10L 21/0232* (2013.01)

(58) Field of Classification Search
CPC .............. G10L 21/0208–21/0264; H04R 3/00; H04R 3/005; H04R 3/04
USPC .......... 381/94.1–94.9, 71.1, 71.11–71.14, 66, 381/86, 91, 92, 122, 83, 93; 704/226, 228
See application file for complete search history.

(56) References Cited

U.S. PATENT DOCUMENTS 7,944,775 B2 * 5/2011 Sugiyama ..................... 367/135
8,315,863 B2 * 11/2012 Oshikiri ........................ 704/203
8,705,759 B2 * 4/2014 Wolff et al. ..................... 381/66
2009/0067642 A1 3/2009 Buck et al.
2011/0305345 A1 * 12/2011 Bouchard et al. ............ 381/23.1
2013/0108077 A1 * 5/2013 Edler et al. ...................... 381/98

FOREIGN PATENT DOCUMENTS

JP 2009-049998 A 3/2009

* cited by examiner

*Primary Examiner* — Xu Mei
(74) *Attorney, Agent, or Firm* — Lerner, David, Littenberg, Krumholz & Mentlik, LLP

(57) ABSTRACT

Disclosed herein is a noise removing apparatus, including: an object sound emphasis section adapted to carry out an object sound emphasis process for observation signals of first and second microphones to produce an object sound estimation signal; a noise estimation section adapted to carry out a noise estimation process for the observation signals to produce a noise estimation signal; a post filtering section adapted to remove noise components remaining in the object sound estimation signal using the noise estimation signal; a correction coefficient calculation section adapted to calculate, for each frequency, a correction coefficient for correcting the post filtering process based on the object sound estimation signal and the noise estimation signal; and a correction coefficient changing section adapted to change those of the correction coefficients which belong to a frequency band suffering from spatial aliasing such that a peak appearing at a particular frequency is suppressed.

20 Claims, 31 Drawing Sheets

NOISE REMOVING APPARATUS AND NOISE REMOVING METHOD

CROSS-REFERENCE TO RELATED APPLICATION

The present application claims priority from Japanese Patent Application No. JP 2010-199517 filed in the Japanese Patent Office on Sep. 7, 2010, the entire content of which is incorporated herein by reference.

BACKGROUND

This disclosure relates to a noise removing apparatus and a noise removing method, and more particularly to a noise removing apparatus and a noise removing method which remove noise by emphasis of object sound and a post filtering process.

It is supposed that a user sometimes uses a noise canceling headphone to enjoy music reproduced, for example, by a portable telephone set, a personal computer or a like apparatus. If, in this situation, a telephone call, a chat call or the like is received, then it is very cumbersome to the user to prepare a microphone every time and then start conversation. It is desirable to the user to start conversation handsfree without preparing a microphone.

A microphone for noise cancellation is installed at a portion of a noise canceling headphone corresponding to an ear, and it is a possible idea to utilize the microphone to carry out conversation. The user can thereby implement conversation while wearing the headphone thereon. In this instance, ambient noise gives rise to a problem, and therefore, it is demanded to transmit only voice with noise suppressed.

A technique for removing noise by emphasis of object sound and a post filtering process is disclosed, for example, in Japanese Patent Laid-Open No. 2009-49998 (hereinafter referred to as Patent Document 1). FIG. 31 shows an example of a configuration of the noise removing apparatus disclosed in Patent Document 1. Referring to FIG. 31, the noise removing apparatus includes a beam former section (11) which emphasizes voice and a blocking matrix section (12) which emphasizes noise. Since noise is not fully canceled by the emphasis of voice, the noise emphasized by the blocking matrix section (12) is used by noise reduction means (13) to reduce noise components.

Further, in the noise removing apparatus, remaining noise is removed by post filtering means (14). In this instance, although outputs of the noise reduction means (13) and processing means (15) are used, a spectrum error is caused by a characteristic of the filter. Therefore, correction is carried out by an adaptation section (16).

In this instance, the correction is carried out such that, within an interval within which no object sound exists but only noise exists, an output S1 of the noise reduction means (13) and an output S2 of the adaptation section (16) become equal to each other. This is represented by the following expression (1):

$$E\{\tilde{A}_n(e^{j\Omega_\mu},k)\}=E\{|A(e^{j\Omega_\mu},k)|^2{}_{A_s(e^{j\Omega_\mu},k)=0}\} \quad (1)$$

where the left side represents an expected value of the output S2 of the adaptation section (16) while the right side represents an expected value of the output S1 of the noise reduction means (13) within an interval within which no object sound exists.

By such correction, within an interval within which only noise exists, no error appears between the outputs S1 and S2 and the post filtering means (14) can remove the noise fully, but within an interval within which both of voice and noise exist, the post filtering means (14) can remove only the noise components while leaving the voice.

It can be interpreted that this correction corrects the directional characteristic of the filter. FIG. 32A illustrates an example of the directional characteristic of a filter before correction, and FIG. 32B illustrates an example of the directional characteristic of the filter after correction. In FIGS. 32A and 32B, the axis of ordinate indicates the gain, and the gain increases upwardly.

In FIG. 32A, a solid line curve a indicates a directional characteristic of emphasizing object sound produced by the beam former section (11). By this directional characteristic, object sound on the front is emphasized while the gain of sound coming from any other direction is lowered. Further, in FIG. 32A, a broken line curve b indicates a directional characteristic produced by the blocking matrix section (12). By this directional characteristic, the gain in the direction of object sound is lowered and noise is estimated.

Before correction, an error in gain exists in the direction of noise between the directional characteristic for object sound emphasis indicated by the solid line curve a and the directional characteristic for noise estimation indicated by the broken line curve b. Therefore, when the noise estimation signal is subtracted from the object sound estimation signal by the post filtering means (14), insufficient cancellation or excessive cancellation of noise occurs.

Meanwhile, in FIG. 32B, a solid line curve a' represents a directional characteristic for object sound emphasis after the correction. Further, in FIG. 32B, a broken line curve b' represents a directional characteristic for noise estimation after the correction. The gains in the direction of noise in the directional characteristic for object sound emphasis and the directional characteristic for noise estimation are adjusted to each other with a correction coefficient. Consequently, when the noise estimation signal is subtracted from the object sound estimation signal by the post filtering means (14), insufficient cancellation or excessive cancellation of noise is reduced.

SUMMARY

The noise suppression technique disclosed in Patent Document 1 described above has a problem in that the distance between microphones is not taken into consideration. In particular, in the noise suppression technique disclosed in Patent Document 1, the correction coefficient cannot sometimes be calculated correctly depending upon the distance between microphones. If the correction coefficient cannot be calculated correctly, then there is the possibility that the object sound may be distorted. In the case where the distance between microphones is great, spatial aliasing wherein a directional characteristic curve is folded is caused, and therefore, the gain in an unintended direction is amplified or attenuated.

FIG. 33 illustrates an example of a directional characteristic of a filter in the case where spatial aliasing occurs. In FIG. 33, a solid line curve a represents a directional characteristic for object sound emphasis produced by the beam former section (11) while a broken line curve b represents a directional characteristic for noise estimation produced by the blocking matrix section (12). In the example of the directional characteristic illustrated in FIG. 33, also noise is amplified simultaneously with object sound. In this instance, even if a correction coefficient is determined, this is meaningless, and the noise suppression performance drops.

In the noise suppression technique disclosed in Patent Document 1 described hereinabove, it is a premise that the distance between microphones is known in advance and besides no spatial aliasing is caused by the microphone distance. This premise makes a considerably significant constraint. For example, the microphone distance which does not cause spatial aliasing in the case of a sampling frequency (8,000 Hz) in a frequency band for the telephone is approximately 4.3 cm.

In order to prevent such spatial aliasing, it is necessary to set the distance between microphones, that is, the distance between devices, in advance. Where the acoustic velocity is represented by c, the distance between microphones, that is, the device distance, by d and the frequency by f, in order to prevent spatial aliasing, the following expression (2) is satisfied:

$$d<c/2f \quad (2)$$

For example, in the case of microphones for noise cancellation installed in a noise canceling headphone, the microphone distance is the distance between the left and right ears. In short, in this instance, the microphone distance of approximately 4.3 cm which does not cause spatial aliasing as described above cannot be applied.

The noise suppression technique disclosed in Patent Document 1 described hereinabove has a further problem in that the number of sound sources of ambient noise is not taken into consideration. In particular, in a situation in which a large number of noise sources exist around a source of object sound, ambient sound is inputted at random among different frames and among different frequencies. In this instance, a location at which gains should be adjusted to each other between the directional characteristic for object sound emphasis and the directional characteristic for noise estimation moves differently among different frames and among different frequencies. Therefore, the correction coefficient always changes together with time and is not stabilized, which has a bad influence on output sound.

FIG. 34 illustrates a situation in which a large number of sound sources exist around a source of object sound. Referring to FIG. 34, a solid line curve a represents a directional characteristic for object sound emphasis similar to that of the solid line curve a in FIG. 32A, and a broken line curve b represents a directional characteristic for noise estimation similar to that of the broken line curve b in FIG. 32A. In the case where a large number of noise sources exist around a source of object noise, gains in the two directional characteristics must be adjusted to each other at many locations. In an actual environment, a large number of noise sources exist around a source of object sound in this manner, and therefore, the noise suppression technique disclosed in Patent Document 1 described hereinabove cannot be ready for such an actual environment.

Therefore, it is desirable to provide a noise removing apparatus and a noise removing method which can carry out a noise removing process without depending upon the distance between microphones. Also it is desirable to provide a noise removing apparatus and a noise removing method which can carry out a suitable noise removing process in response to a situation of ambient noise.

According to an embodiment of the disclosed technology, there is provided a noise removing apparatus including an object sound emphasis section adapted to carry out an object sound emphasis process for observation signals of first and second microphones disposed in a predetermined spaced relationship from each other to produce an object sound estimation signal, a noise estimation section adapted to carry out a noise estimation process for the observation signals of the first and second microphones to produce a noise estimation signal, a post filtering section adapted to remove noise components remaining in the object sound estimation signal produced by the object sound emphasis section by a post filtering process using the noise estimation signal produced by the noise estimation section, a correction coefficient calculation section adapted to calculate, for each frequency, a correction coefficient for correcting the post filtering process to be carried out by the post filtering section based on the object sound estimation signal produced by the object sound emphasis section and the noise estimation signal produced by the noise estimation section, and a correction coefficient changing section adapted to change those of the correction coefficients calculated by the correction coefficient calculation section which belong to a frequency band which suffers from spatial aliasing such that a peak which appears at a particular frequency is suppressed.

In the noise removing apparatus, the object sound emphasis section carries out an object sound emphasis process for observation signals of the first and second microphones disposed in a predetermined spaced relationship from each other to produce an object sound estimation signal. As the object sound emphasis process, for example, a DS (Delay and Sum) method, an adaptive beam former process or the like, which are known already, may be used. Further, the noise estimation section carries out a noise estimation process for the observation signals of the first and second microphones to produce a noise estimation signal. As the noise estimation process, for example, a NBF (Null-Beam Former) process, an adaptive beam former process or the like, which are known already, may be used.

The post filtering section removes noise components remaining in the object sound estimation signal produced by the object sound emphasis section by a post filtering process using the noise estimation signal produced by the noise estimation section. As the post filtering process, for example, a spectrum subtraction method, a MMSE-STSA (Minimum Mean-Square-Error Short-Time Spectral Amplitude estimator) method or the like, which are known already, may be used. Further, the correction coefficient calculation section calculates, for each frequency, a correction coefficient for correcting the post filtering process to be carried out by the post filtering section based on the object sound estimation signal produced by the object sound emphasis section and the noise estimation signal produced by the noise estimation section.

The correction coefficient changing section changes those of the correction coefficients calculated by the correction coefficient calculation section which belong to a frequency band which suffers from spatial aliasing such that a peak which appears at a particular frequency is suppressed. For example, the correction coefficient changing section smoothes, in the frequency band which suffers from the spatial aliasing, the correction coefficients calculated by the correction coefficient calculation section in a frequency direction to produce changed correction coefficients for the frequencies. Or, the correction coefficient changing section changes the correction coefficients for the frequencies in the frequency band which suffers from the spatial aliasing to 1.

In the case where the distance between the first and second microphones, that is, the microphone distance, is great, spatial aliasing occurs, and the object sound emphasis indicates such a directional characteristic that also sound from any other direction than the direction of the object sound source is emphasized. Among those of the correction coefficients for the frequencies calculated by the correction coefficient calculation section which belong to the frequency band which suffers from spatial aliasing, a peak appears at a particular frequency. Therefore, if this correction coefficient is used as it is, then the peak appearing at the particular frequency has a bad influence on the output sound and degrades the sound quality as described hereinabove.

In the noise removing apparatus, those correction coefficients in the frequency band which suffers from spatial aliasing are changed such that a peak appearing at a particular frequency is suppressed. Therefore, a bad influence of the peak on the output sound can be moderated and degradation of the sound quality can be suppressed. Consequently, a noise removing process which does not rely upon the microphone distance can be achieved.

The noise removing apparatus may further include an object sound interval detection section adapted to detect an interval within which object sound exists based on the object sound estimation signal produced by the object sound emphasis section and the noise estimation signal produced by the noise estimation section, the calculation of correction coefficients being carried out within an interval within which no object sound exists based on object sound interval information produced by the object sound interval detection section. In this instance, since only noise components are included in the object sound estimation signal, the correction coefficient can be calculated with a high degree of accuracy without being influenced by the object sound.

For example, the object sound detection section determines an energy ratio between the object sound estimation signal and the noise estimation signal and, when the energy ratio is higher than a threshold value, decides that a current interval is an object sound interval.

The correction coefficient calculation section may use an object sound estimation signal Z(f, t) and a noise estimation signal N(f, t) for a frame t of an fth frequency and a correction coefficient β(f, t−1) for a frame t−1 of the fth frequency to calculate a correction coefficient β(f, t) of the frame t of the fth frequency in accordance with an expression $$\beta(f,t)=\{\alpha\cdot\beta(f,t-1)\}+\left\{(1-\alpha)\cdot\frac{Z(f,t)}{N(f,t)}\right\}$$

where α is a smoothing coefficient.

According to another embodiment of the disclosed technology, there is provided a noise removing apparatus including an object sound emphasis section adapted to carry out an object sound emphasis process for observation signals of first and second microphones disposed in a predetermined spaced relationship from each other to produce an object sound estimation signal, a noise estimation section adapted to carry out a noise estimation process for the observation signals of the first and second microphones to produce a noise estimation signal, a post filtering section adapted to remove noise components remaining in the object sound estimation signal produced by the object sound emphasis section by a post filtering process using the noise estimation signal produced by the noise estimation section, a correction coefficient calculation section adapted to calculate, for each frequency, a correction coefficient for correcting the post filtering process to be carried out by the post filtering section based on the object sound estimation signal produced by the object sound emphasis section and the noise estimation signal produced by the noise estimation section, an ambient noise state estimation section adapted to process the observation signals of the first and second microphones to produce sound source number information of ambient noise, and a correction coefficient changing section adapted to smooth the correction coefficient calculated by the correction coefficient calculation section in a frame direction such that the number of smoothed frames increases as the number of sound sources increases based on the sound source number information of ambient noise produced by the ambient noise state estimation section to produce changed correction coefficients for the frames.

In the noise removing apparatus, the object sound emphasis section carries out an object sound emphasis process for observation signals of the first and second microphones disposed in a predetermined spaced relationship from each other to produce an object sound estimation signal. As the object sound emphasis process, for example, a DS (Delay and Sum) method, an adaptive beam former process or the like, which are known already, may be used. Further, the noise estimation section carries out a noise estimation process for the observation signals of the first and second microphones to produce a noise estimation signal. As the noise estimation process, for example, a NBF (Null-Beam Former) process, an adaptive beam former process or the like, which are known already, may be used.

The post filtering section removes noise components remaining in the object sound estimation signal produced by the object sound emphasis section by a post filtering process using the noise estimation signal produced by the noise estimation section. As the post filtering process, for example, a spectrum subtraction method, a MMSE-STSA method or the like, which are known already, may be used. Further, the correction coefficient calculation section calculates, for each frequency, a correction coefficient for correcting the post filtering process to be carried out by the post filtering section based on the object sound estimation signal produced by the object sound emphasis section and the noise estimation signal produced by the noise estimation section.

The ambient noise state estimation section processes the observation signals of the first and second microphones to produce sound source number information of ambient noise. For example, the ambient noise state estimation section calculates a correlation coefficient of the observation signals of the first and second microphones and uses the calculated correlation coefficient as the sound source number information of ambient noise. Then, the correction coefficient changing section smoothes the correction coefficient calculated by the correction coefficient calculation section in a frame direction such that the number of smoothed frames increases as the number of sound sources increases based on the sound source number information of ambient noise produced by the ambient noise state estimation section to produce changed correction coefficients for the frames.

In a situation in which a large number of noise sources exist around an object sound source, sound from the ambient noise sources is inputted at random for each frequency for each frame, and the place at which the gains for the directional characteristic of the object sound emphasis and the directional characteristic of the noise estimation are to be adjusted to each other moves dispersedly among different frames among different frequencies. In short, the correction coefficient calculated by the correction coefficient calculation section normally varies together with time and is not stabilized, and this has a bad influence on the output sound.

In the noise removing apparatus, as the number of sound sources of ambient noise increases, the smoothed frame number increases, and as a correction coefficient for each frame, that obtained by smoothing in the frame direction is used. Consequently, in a situation in which a large number of noise sources exist around an object sound source, the variation of the correction coefficient in the time direction can be suppressed to reduce the influence to be had on the output sound. Consequently, a noise removing process suitable for a situation of ambient noise, that is, for a realistic environment in which a large number of noise sources exist around an object sound source, can be anticipated.

According to further embodiment of the disclosed technology, there is provided a noise removing apparatus, including an object sound emphasis section adapted to carry out an object sound emphasis process for observation signals of first and second microphones disposed in a predetermined spaced relationship from each other to produce an object sound estimation signal, a noise estimation section adapted to carry out a noise estimation process for the observation signals of the first and second microphones to produce a noise estimation signal, a post filtering section adapted to remove noise components remaining in the object sound estimation signal produced by the object sound emphasis section by a post filtering process using the noise estimation signal produced by the noise estimation section, a correction coefficient calculation section adapted to calculate, for each frequency, a correction coefficient for correcting the post filtering process to be carried out by the post filtering section based on the object sound estimation signal produced by the object sound emphasis section and the noise estimation signal produced by the noise estimation section, a first correction coefficient changing section adapted to change those of the correction coefficients calculated by the correction coefficient calculation section which belong to a frequency band which suffers from spatial aliasing such that a peak which appears at a particular frequency is suppressed, an ambient noise state estimation section adapted to process the observation signals of the first and second microphones to produce sound source number information of ambient noise, and a second correction coefficient changing section adapted to smooth the correction coefficient calculated by the correction coefficient calculation section in a frame direction such that the number of smoothed frames increases as the number of sound sources increases based on the sound source number information of ambient noise produced by the ambient noise state estimation section to produce changed correction coefficients for the frames.

In summary, with the noise removing apparatus, correction coefficients in a frequency band in which spatial aliasing occurs are changed such that a peak which appears at a particular frequency is suppressed. Consequently, a bad influence of the peak on the output sound can be reduced and degradation of the sound quality can be suppressed, and therefore, a noise removing process which does not rely upon the microphone distance can be achieved. Further, with the noise removing apparatus, as the number of sound sources of ambient noise increases, the smoothed frame number increases, and as the correction coefficient for each frame, that obtained by smoothing in the frame direction is used. Consequently, in a situation in which a large number of noise sources exist around an object sound source, the variation of the correction coefficient in the time direction can be suppressed to reduce the influence to be had on the output sound. Consequently, a noise removing process suitable for a situation of ambient noise can be anticipated.

The above and other features and advantages of the present technology will become apparent from the following description and the appended claims, taken in conjunction with the accompanying drawings in which like parts or elements denoted by like reference characters.

DETAILED DESCRIPTION OF THE PREFERRED EMBODIMENTS

In the following, preferred embodiments of the disclosed technology are described. It is to be noted that the description is given in the following order:

1. First Embodiment
2. Second Embodiment
3. Third Embodiment
4. Fourth Embodiment
5. Modifications

1. First Embodiment

Example of the Configuration of the Sound Inputting System

Figure 1:
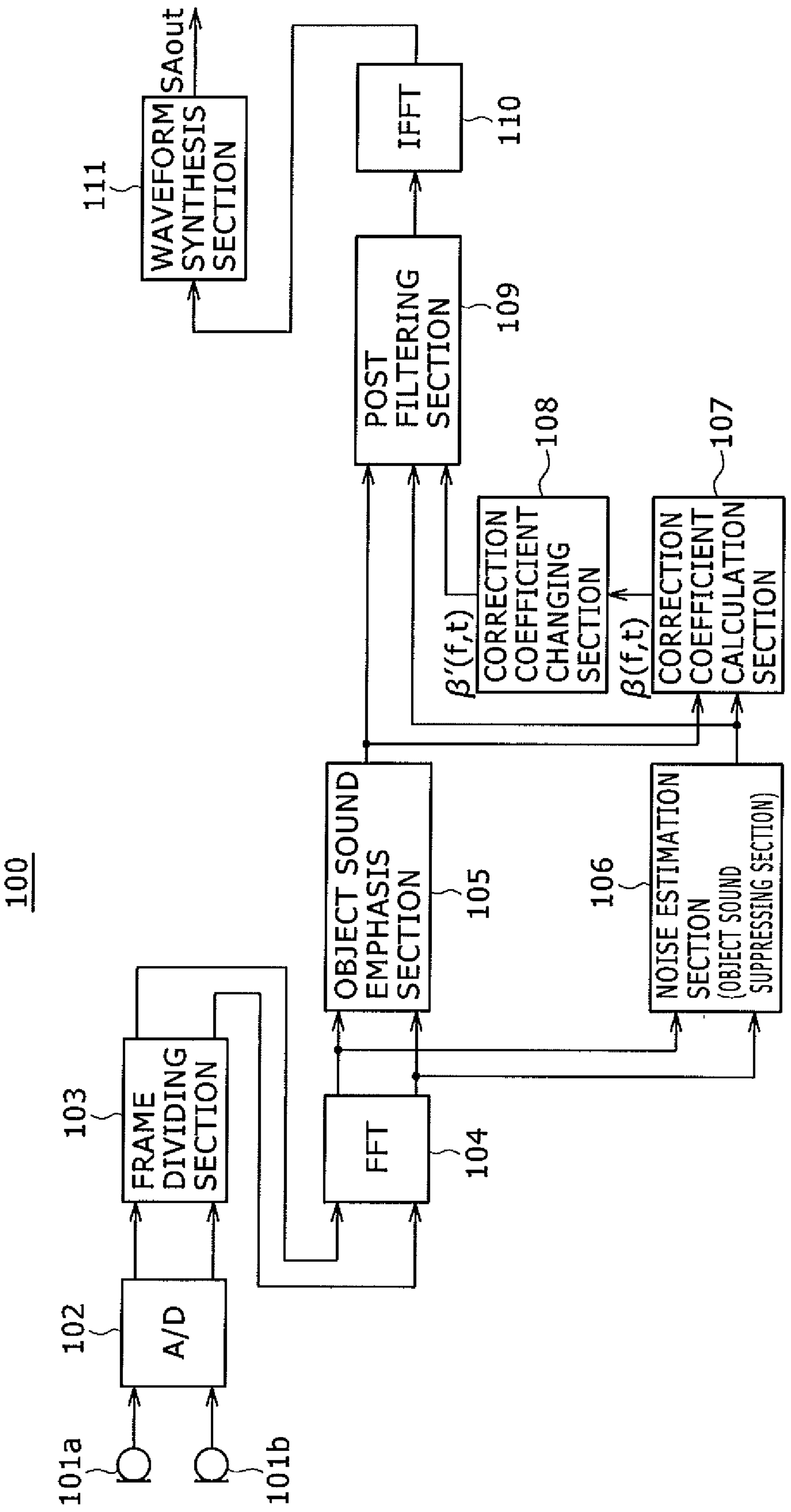
FIG. 1 is a block diagram showing an example of a configuration of a sound inputting system according to a first embodiment of the technology disclosed herein.

FIG. 1 shows an example of a configuration of a sound inputting system according to a first embodiment of the disclosed technology. Referring to FIG. 1, the sound inputting system 100 shown carries out sound inputting using microphones for noise cancellation installed in left and right headphone portions of a noise canceling headphone.

The sound inputting system 100 includes a pair of microphones 101*a* and 101*b*, an analog to digital (A/D) converter 102, a frame dividing section 103, a fast Fourier transform (FFT) section 104, an object sound emphasis section 105, and a noise estimation section or object sound suppression section 106. The sound inputting system 100 further includes a correction coefficient calculation section 107, a correction coefficient changing section 108, a post filtering section 109, an inverse fast Fourier transform (IFFT) section 110, and a waveform synthesis section 111.

The microphones 101*a* and 101*b* collect ambient sound to produce respective observation signals. The microphone 101*a* and the microphone 101*b* are disposed in a juxtaposed relationship with a predetermined distance therebetween. In the present embodiment, the microphones 101*a* and 101*b* are noise canceling microphones installed in the left and right headphone portions of the noise canceling headphone.

The A/D converter 102 converts observation signals produced by the microphones 101*a* and 101*b* from analog signals into digital signals. The frame dividing section 103 divides the observation signals after converted into digital signals into frames of a predetermined time length, that is, frames the observation signals, in order to allow the observation signals to be processed for each frame. The fast Fourier transform section 104 carries out a fast Fourier transform (FFT) process for the framed signals produced by the frame dividing section 103 to convert them into frequency spectrums X(f, t) in the frequency domain. Here, (f, t) represents a frequency spectrum of the frame t of the fth frequency. Particularly, f represents a frequency, and t represents a time index.

Figure 2:
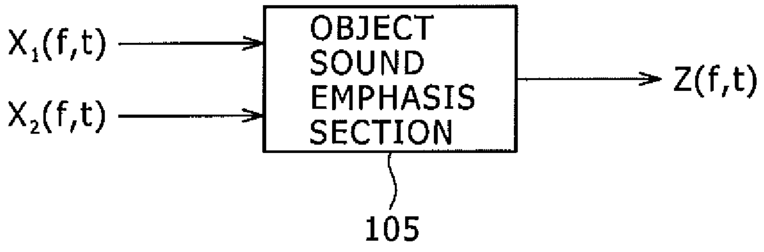
FIG. 2 is a block diagram showing an object sound emphasis section shown in FIG. 1.

The object sound emphasis section 105 carries out an object sound emphasis process for the observation signals of the microphones 101*a* and 101*b* to produce respective object sound estimation signals for each frequency for each frame. Referring to FIG. 2, the object sound emphasis section 105 produces an object sound estimation signal Z(f, t) where the observation signal of the microphone 101*a* is represented by $X_1(f, t)$ and the observation signal of the microphone 101*b* by $X_2(f, t)$. The object sound emphasis section 105 uses, as the object sound emphasis process, for example, a DS (Delay and Sum) process or an adaptive beam former process which are already known.

The DS is a technique for adjusting the phase of signals inputted to the microphones 101*a* and 101*b* to the direction of an object sound source. The microphones 101*a* and 101*b* are provided for noise cancellation in the left and right headphone portions of the noise canceling headphone, and the mouth of the user is directed to the front without fail as viewed from the microphones 101*a* and 101*b*.

To this end, where a DS process is used, the object sound emphasis section 105 carries out an addition process of the observation signal $X_1(f, t)$ and the observation signal $X_2(f, t)$ and then divides the sum in accordance with the expression (3) given below to produce the object sound estimation signal Z(f, t):

$$Z(f,t)=\{X_1(f,t)+X_2(f,t)\}/2 \quad (3)$$

It is to be noted that the DS is a technique called fixed beam former and varies the phase of an input signal to control the directional characteristic. If the microphone distance is known in advance, then also it is possible for the object sound emphasis section 105 to use such a process as an adaptive beam former process or the like in place of the DS process to produce the object sound estimation signal Z(f, t) as described hereinabove.

Referring back to FIG. 1, the noise estimation section or object sound suppression section 106 carries out a noise estimation process for the observation signals of the microphones 101*a* and 101*b* to produce a noise estimation signal for each frequency in each frame. The noise estimation section 106 estimates sound other than the object sound which is voice of the user as noise. In other words, the noise estimation section 106 carries out a process of removing only the object sound while leaving the noise.

Figure 3:
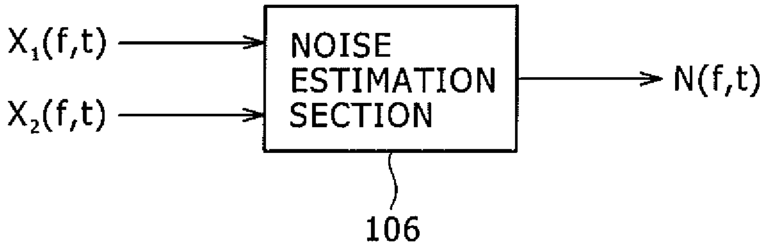
FIG. 3 is a block diagram showing a noise estimation section shown in FIG. 1.

Referring to FIG. 3, the noise estimation section 106 determines a noise estimation signal N(f, t) where the observation signal of the microphone 101a is represented by $X_1$(f, t) and the observation signal of the microphone 101b by $X_2$(f, t). The noise estimation section 106 uses, as the noise estimation process thereof, a null beam former (NBF) process, an adaptive beam former process or a like process which are currently available.

As described hereinabove, the microphones 101a and 101b are noise canceling microphones installed in the left and right headphone portions of the noise canceling headphone as described hereinabove, and the mouth of the user is directed toward the front as viewed from the microphones 101a and 101b without fail. Therefore, in the case where the NBF process is used, the noise estimation section 106 carries out a subtraction process between the observation signal $X_1$(f, t) and the observation signal $X_2$(f, t) and then divides the difference by 2 in accordance with the expression (4) given below to produce the noise estimation signal N(f, t).

$$N(f,t)=\{X_1(f,t)-X_2(f,t)\}/2 \tag{4}$$

It is to be noted that the NBF is a technique called fixed beam former and varies the phase of an input signal to control the directional characteristic. In the case where the microphone distance is known in advance, also it is possible for the noise estimation section 106 to use such a process as an adaptive beam former process in place of the NBF process to produce the noise estimation signal N(f, t) as described hereinabove.

Figure 4:
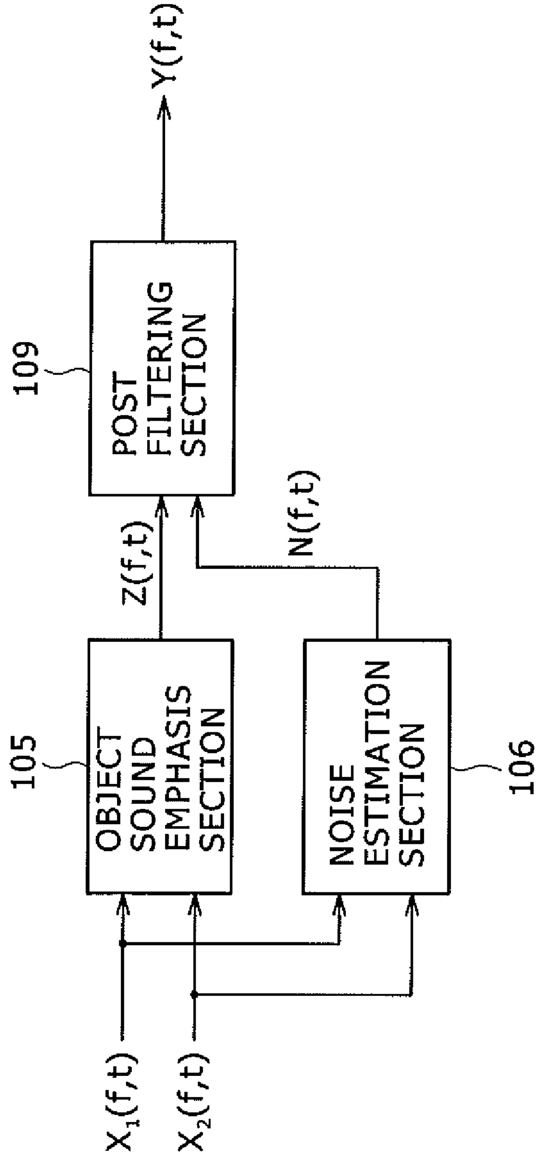
FIG. 4 is a block diagram showing a post filtering section shown in FIG. 1.

Referring back to FIG. 1, the post filtering section 109 removes noise components remaining in the object sound estimation signal Z(f, t) obtained by the object sound emphasis section 105 by a post filtering process using the noise estimation signal N(f, t) obtained by the noise estimation section 106. In other words, the post filtering section 109 produces a noise suppression signal Y(f, t) based on the object sound estimation signal Z(f, t) and the noise estimation signal N(f, t) as seen in FIG. 4.

The post filtering section 109 uses a known technique such as a spectrum subtraction method or a MMSE-STSA method to produce a noise suppression signal Y(f, t). The spectrum subtraction method is disclosed, for example, in S. F. Boll, "Suppression of acoustic noise in speech using spectral subtraction," IEEE Trans. Acoustics, Speech, and Signal Processing, Vol. 27, No. 2, pp. 113-120, 1979. Meanwhile, the MMSE-STSA method is disclosed in Y. Ephraim and D. Malah, "Speech enhancement using a minimum mean-square error short-time spectral amplitude estimator," IEEE Trans. Acoustics, Speech, and Signal Processing, Vol. 32, No. 6, pp. 1109 to 1121, 1984.

Figure 5:
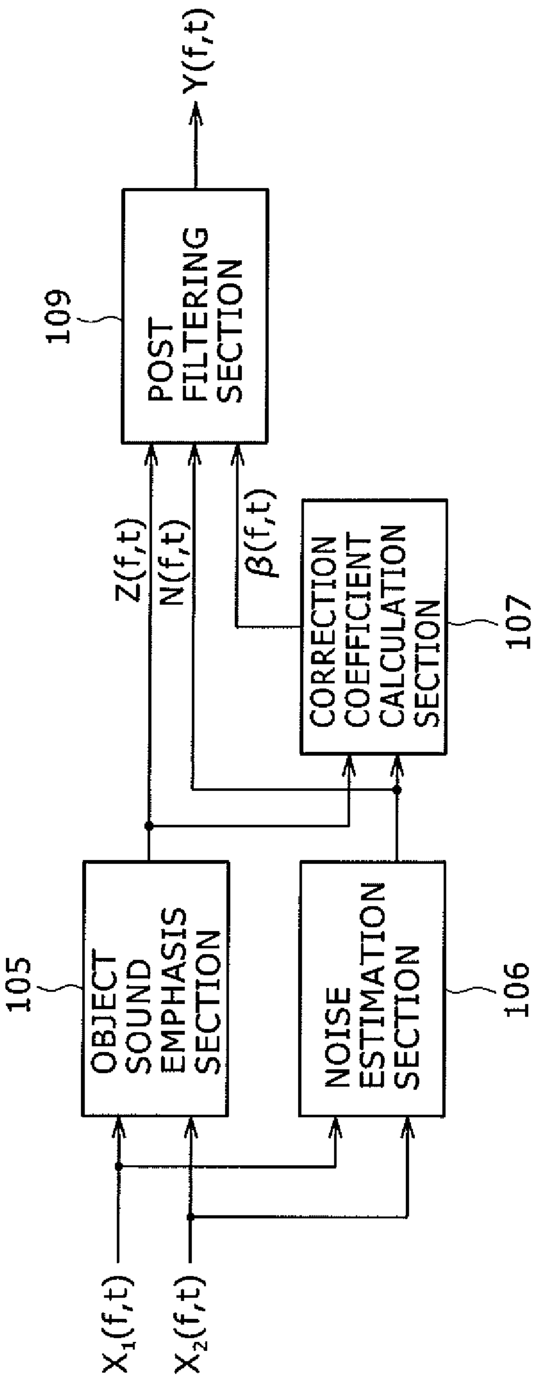
FIG. 5 is a block diagram showing a correlation coefficient calculation section shown in FIG. 1.

Referring back to FIG. 1, the correction coefficient calculation section 107 calculates the correction coefficient β(f, t) for each frequency in each frame. This correction coefficient β(f, t) is used to correct a post filtering process carried out by the post filtering section 109 described hereinabove, that is, to adjust the gain of noise components remaining in the object sound estimation signal Z(f, t) and the gain of the noise estimation signal N(f, t) to each other. Referring to FIG. 5, the correction coefficient calculation section 107 calculates, based on the object sound estimation signal Z(f, t) produced by the object sound emphasis section 105 and the noise estimation signal N(f, t) produced by the noise estimation section 106, the correction coefficient β(f, t) for each frequency in each frame.

In the present embodiment, the correction coefficient calculation section 107 calculates the correction coefficient β(f, t) in accordance with the following expression (5):

$$\beta(f,t)=\{\alpha\cdot\beta(f,t-1)\}+\left\{(1-\alpha)\cdot\frac{Z(f,t)}{N(f,t)}\right\} \tag{5}$$

The correction coefficient calculation section 107 uses not only a calculation coefficient for the current frame but also a correction coefficient β(f, t−1) for the immediately preceding frame to carry out smoothing thereby to determine a stabilized correction coefficient β(f, t) because, if only the calculation coefficient for the current frame is used, the correction coefficient disperses for each frame. The first term of the right side of the expression (5) is for carrying the correction coefficient β(f, t−1) for the immediately preceding frame, and the second term of the right side of the expression (5) is for calculating a coefficient for the current frame. It is to be noted that α is a smoothing coefficient which is a fixed value of, for example, 0.9 or 0.95 such that the weight is placed on the immediately preceding frame.

Where the known technique of the spectrum subtraction method is used to produce the noise suppression signal Y(f, t), the post filtering section 109 described hereinabove uses such a correction coefficient β(f, t) as given by the following expression (6):

$$Y(f,t)=Z(f,t)-\beta(f,t)*N(f,t) \tag{6}$$

In particular, the post filtering section 109 multiplies the noise estimation signal N(f, t) by the correction coefficient β(f, t) to carry out correction of the noise estimation signal N(f, t). In the expression (6) above, correction is not carried out where the correction coefficient β(f, t) is equal to 1.

The correction coefficient changing section 108 changes those of the correction coefficient β(f, t) calculated by the correction coefficient calculation section 107 for each frame which belong to a frequency band which suffers from spatial aliasing such that a peak which appears at a particular frequency is suppressed. The post filtering section 109 actually uses not the correction coefficients β(f, t) themselves calculated by the correction coefficient calculation section 107 but the correction coefficients β'(f, t) after such change.

As described hereinabove, in the case where the microphone distance is great, spatial aliasing wherein a directional characteristic curve is folded back occurs, and the directional characteristic for object sound emphasis becomes such a directional characteristic with which also sound from a direction other than the direction of the object sound source is emphasized. Among those of the correction coefficients for the frequencies calculated by the correction coefficient calculation section 107 which belong to a frequency band in which spatial aliasing occurs, a peak appears at a particular frequency. If this correction coefficient is used as it is, then the peak appearing at the particular frequency has a bad influence on the output sound and degrades the sound quality.

Figure 6:
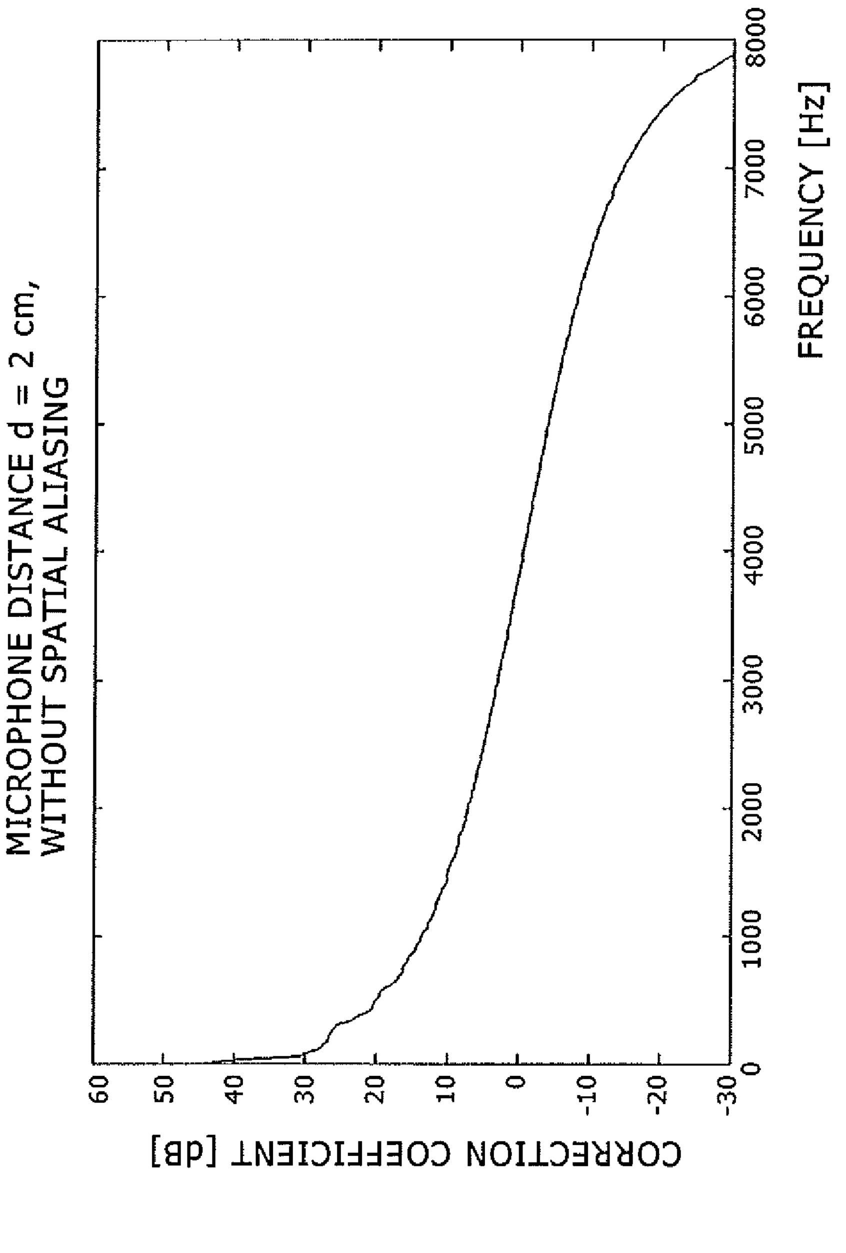
FIG. 6 is a diagram illustrating an example of a correction coefficient for each frequency calculated by the correlation coefficient calculation section of FIG. 5 where the microphone distance is 2 cm and no spatial aliasing exists.
Figure 7:
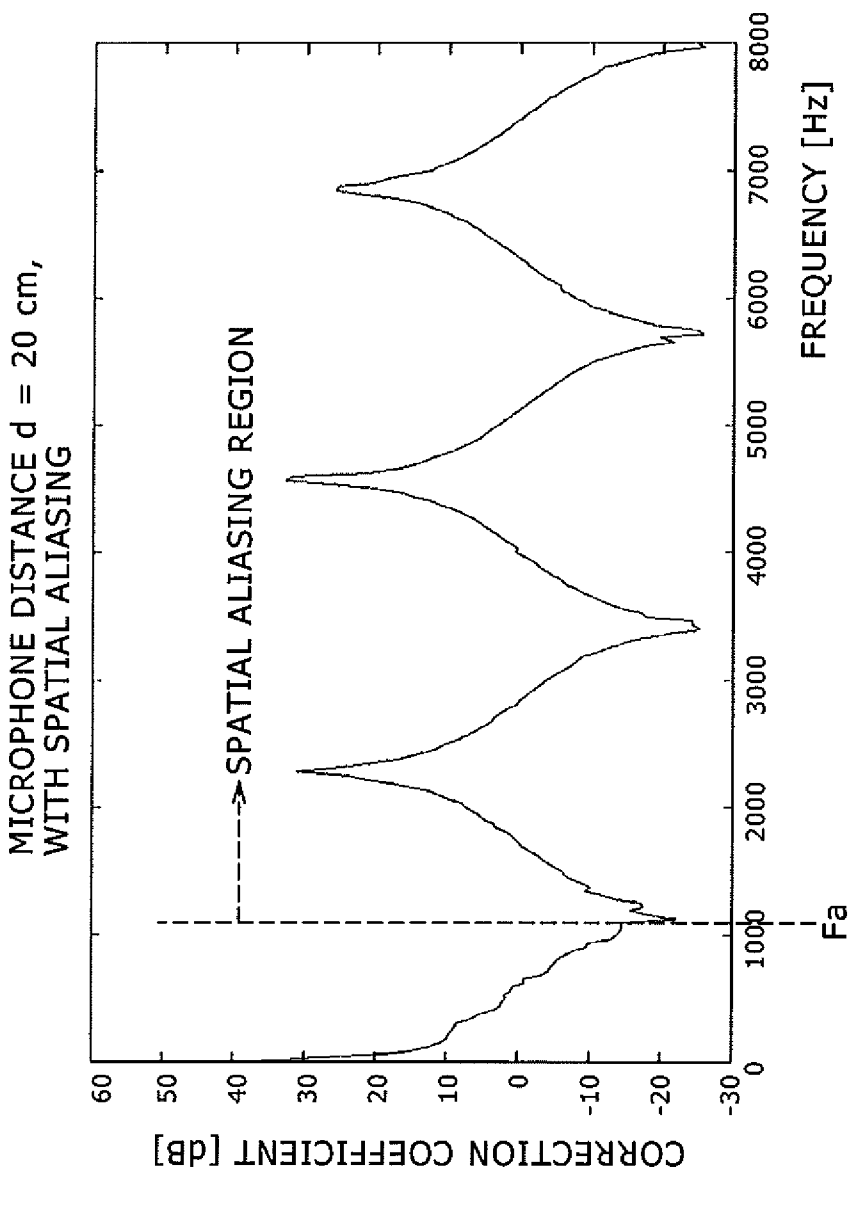
FIG. 7 is a diagram illustrating an example of a correction coefficient for each frequency calculated by the correlation coefficient calculation section of FIG. 5 where the microphone distance is 20 cm and spatial aliasing exists.
Figure 8:
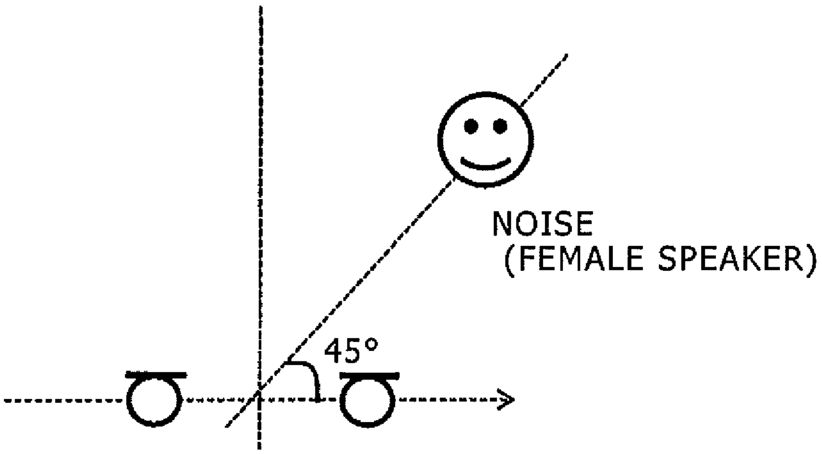
FIG. 8 is a diagrammatic view illustrating a noise source which is a female speaker existing in a direction of 45°.

FIGS. 6 and 7 illustrate examples of a correction coefficient in the case where a noise source which is a female speaker exists in the direction of 45° as seen in FIG. 8. More particularly, FIG. 6 illustrates the example in the case where the microphone distance d is 2 cm and no spatial aliasing exists. In contrast, FIG. 7 illustrates the example in the case where the microphone distance d is 20 cm and spatial aliasing exists and besides a peak appears at particular frequencies.

Figure 9:
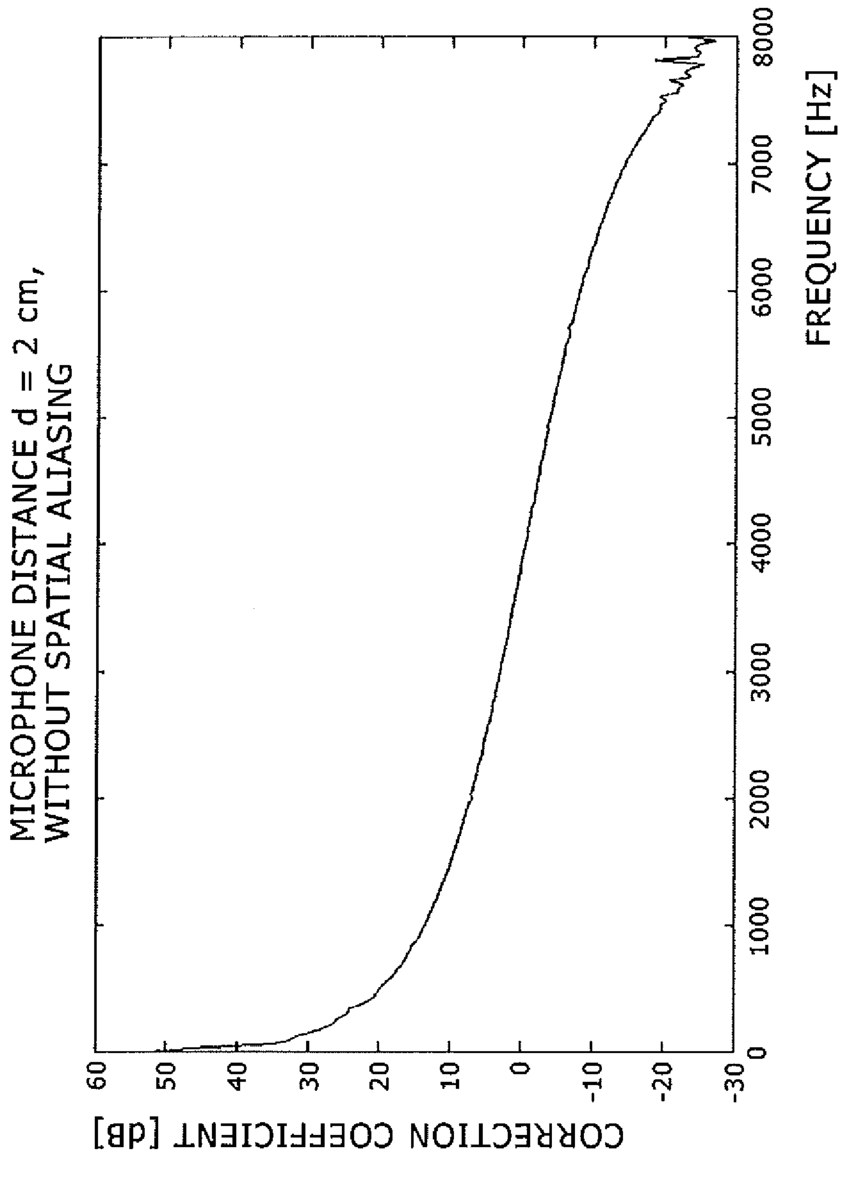
FIG. 9 is a diagram illustrating an example of a correction coefficient for each frequency calculated by the correlation coefficient calculation section of FIG. 5 where the microphone distance is 2 cm and no spatial aliasing exists while two noise sources exist.
Figure 10:
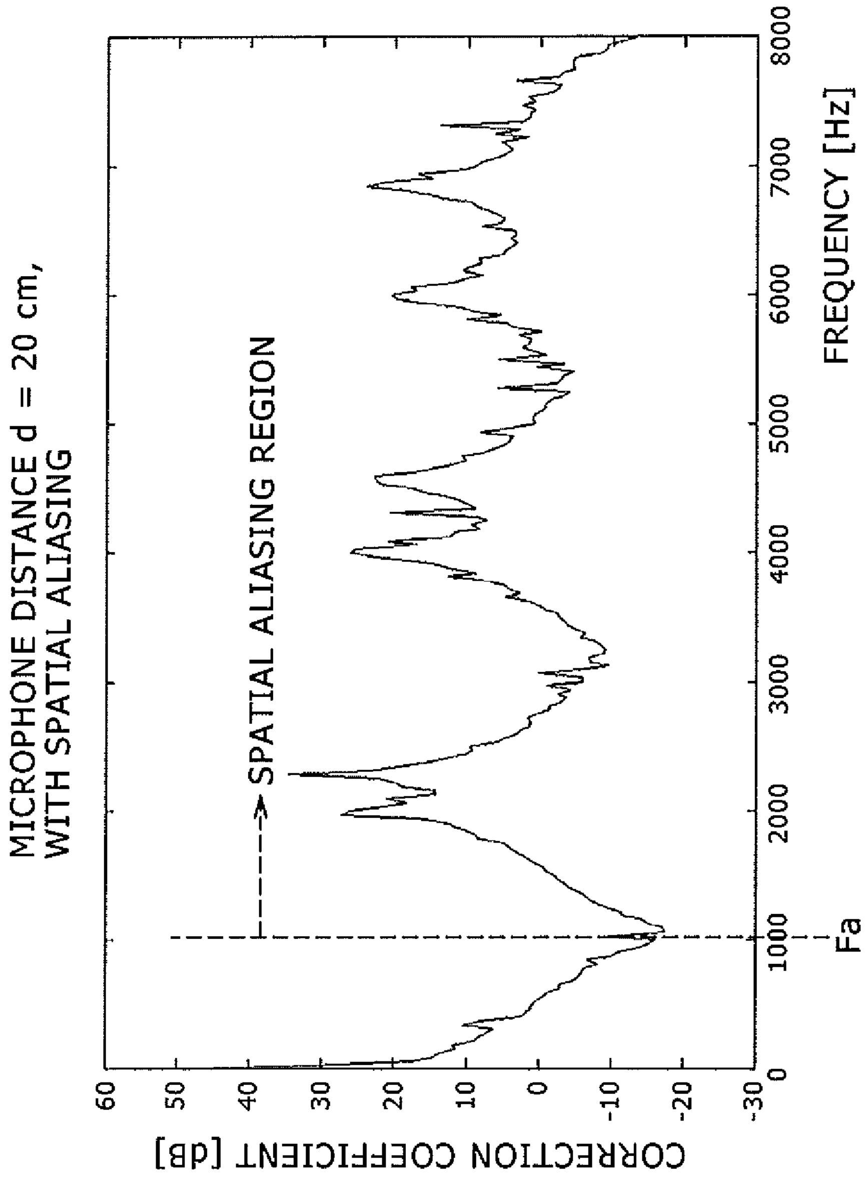
FIG. 10 is a diagram illustrating an example of a correction coefficient for each frequency calculated by the correlation coefficient calculation section of FIG. 5 where the microphone distance is 20 cm and spatial aliasing exists while two noise sources exist.
Figure 11:
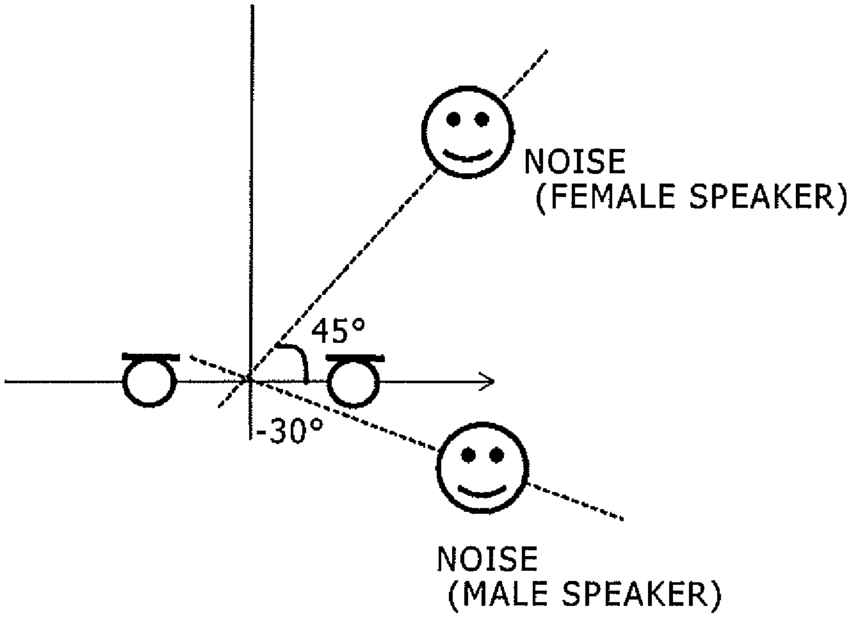
FIG. 11 is a diagrammatic view illustrating a noise source which is a female speaker existing in a direction of 45° and another noise source which is a male speaker existing in a direction of −30°.

In the examples of the correction coefficient of FIGS. 6 and 7, the number of noise sources is one. However, in an actual environment, the number of noise sources is not one. FIGS. 9 and 10 illustrate examples of the correction coefficient in the case where a noise source which is a female speaker exists in the direction of 45° and another noise source which is a male speaker exists in the direction of −30° as seen in FIG. 11.

In particular, FIG. 9 illustrates the example wherein the microphone distance d is 2 cm and no spatial aliasing exists. In contrast, FIG. 10 illustrates the example wherein the microphone distance d is 20 cm and spatial aliasing exists and besides a peak appears at a particular frequency. In this instance, although the coefficient exhibits complicated peaks in comparison with the case wherein one noise source exists as seen in FIG. 7, the value of the coefficient exhibits a drop at some frequencies similarly as in the case where the number of noise sources is one.

The correction coefficient changing section 108 checks the correction coefficients β(f, t) calculated by the correction coefficient calculation section 107 to find out the first frequency Fa(t) on the lower frequency band side at which the value of the coefficient exhibits a drop. The correction coefficient changing section 108 decides that, in a frequency higher than the frequency Fa(t), spatial aliasing occurs as seen in FIG. 7 or 10. Then, the correction coefficient changing section 108 changes those of the correction coefficients β(f, t) calculated by the correction coefficient calculation section 107 which belong to the frequency band which suffers from such spatial aliasing such that the peak appearing at the particular frequency is suppressed.

Figure 12:
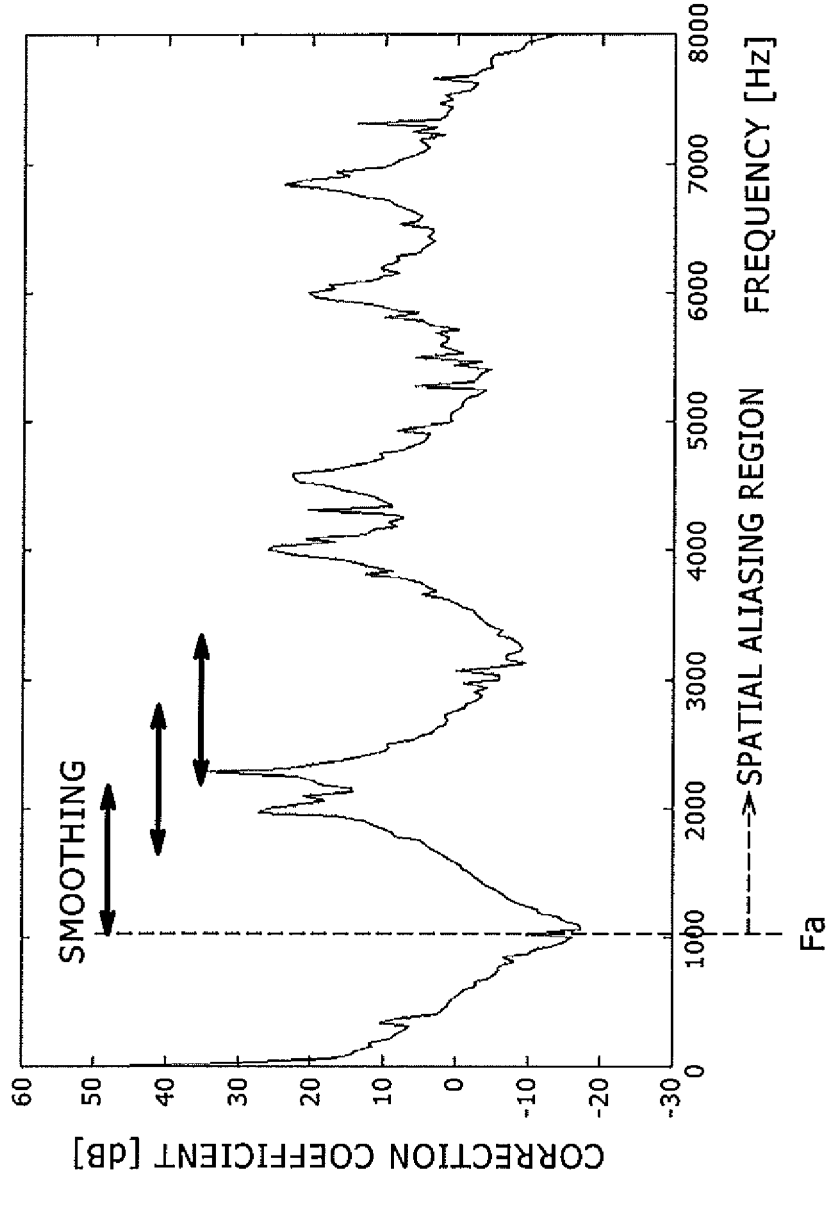
FIGS. 12 and 13 are diagrams illustrating a first method wherein coefficients in a frequency band, in which spatial aliasing occurs, are smoothed in a frequency direction in order to change the coefficients so that a peak which appears at a particular frequency may be suppressed.
Figure 13:
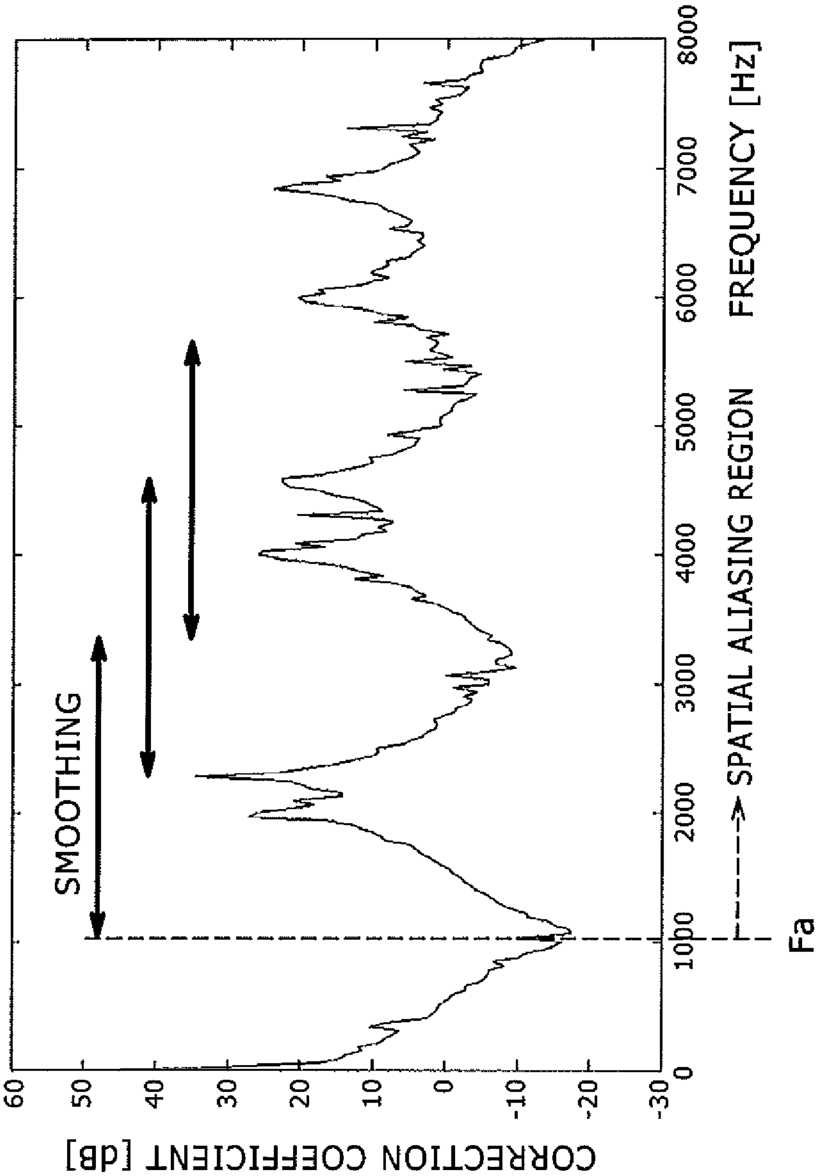

The correction coefficient changing section 108 changes the correction coefficients in the frequency band suffering from spatial aliasing using, for example, a first method or a second method. In the case where the first method is used, the correction coefficient changing section 108 produces a changed correction coefficient β'(f, t) for each frequency in the following manner. In particular, the correction coefficient changing section 108 smoothes those of the correction coefficients β(f, t) calculated by the correction coefficient calculation section 107 which belong to the frequency band which suffers from spatial aliasing in the frequency direction to produce changed correction coefficients β'(f, t) for the frequencies as seen in FIGS. 12 and 13.

By such smoothing in the frequency direction, a peak of the coefficient which appears excessively can be suppressed. It is to be noted that the length of the interval for smoothing can be set arbitrarily, and in FIG. 12, an arrow mark is shown in a short length such that it is represented that the interval length is set short. Meanwhile, in FIG. 13, an arrow mark is shown longer such that it is represented that the interval length is set long.

Figure 14:
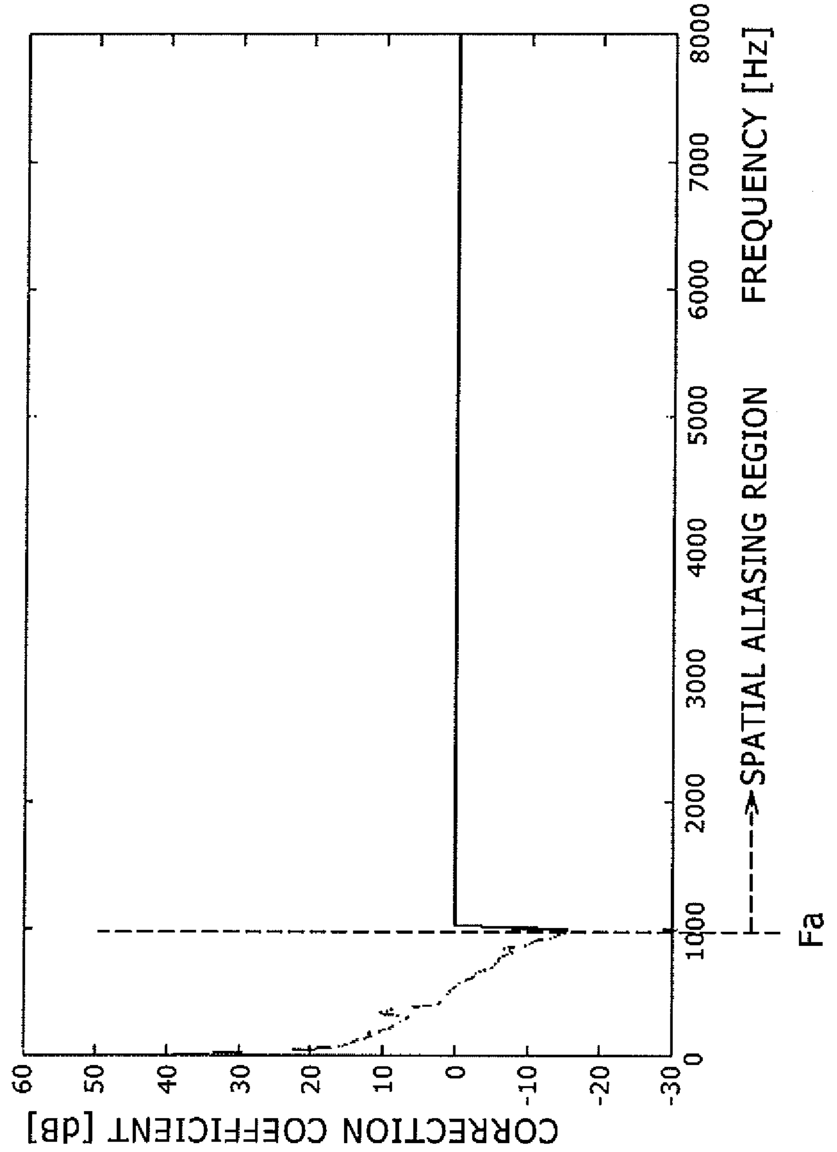
FIG. 14 is a diagram illustrating a second method wherein coefficients in a frequency band, in which spatial aliasing occurs, are replaced into 1 in order to change the coefficients so that a peak which appears at a particular frequency may be suppressed.

On the other hand, in the case where the second method is used, the correction coefficient changing section 108 replaces those of the correction coefficients β(f, t) calculated by the correction coefficient calculation section 107 which belong to the frequency band which suffers from spatial aliasing into 1 to produce changed correction coefficients β'(f, t) as seen in FIG. 14. It is to be noted that, since FIG. 14 is represented by an exponential notation, 0 is represented in place of 1. This second method utilizes the fact that, where extreme smoothing is used in the first method, the correction coefficient approaches 1. The second method is advantageous in that arithmetic operation for smoothing can be omitted.

Figure 15:
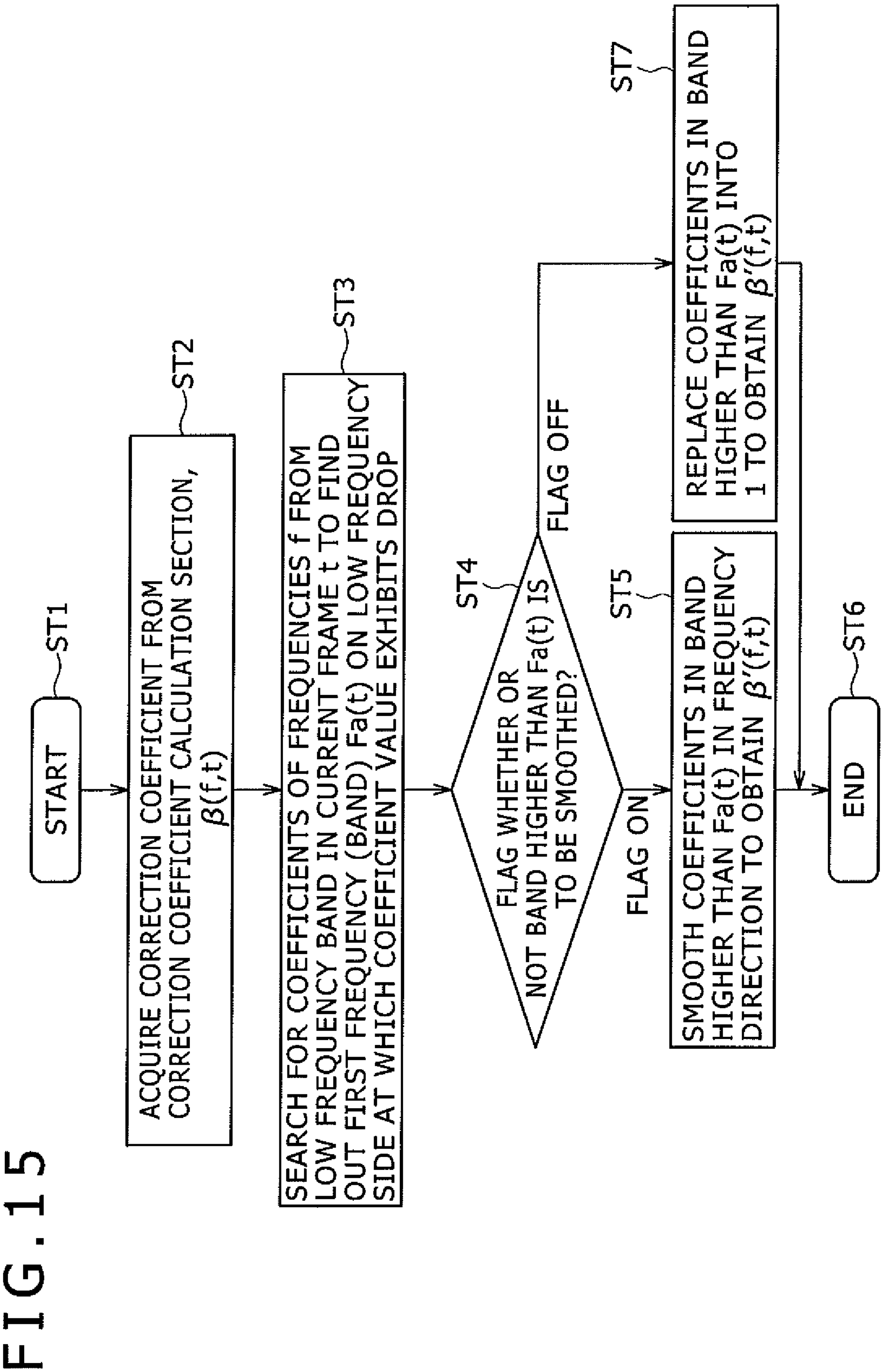
FIG. 15 is a flow chart illustrating a procedure of processing by a correction coefficient changing section shown in FIG. 1.

FIG. 15 illustrates a procedure of processing by the correction coefficient changing section 108 for one frame. Referring to FIG. 15, the correction coefficient changing section 108 starts its processing at step ST1 and then advances the processing to step ST2. At step ST2, the correction coefficient changing section 108 acquires correction coefficients β(f, t) from the correction coefficient calculation section 107. Then at step ST3, the correction coefficient changing section 108 searches for a coefficient for each frequency f from within the low frequency region for a current frame t and finds out the first frequency Fa(t) on the lower frequency side at which the value of the coefficient exhibits a drop.

Then at step ST4, the correction coefficient changing section 108 checks a flag representative of whether or not the frequency band higher than frequency Fa(t), that is, the frequency band which suffers from spatial aliasing, should be smoothed. It is to be noted that this flag is set in advance by an operation of the user. If the flag is on, then the correction coefficient changing section 108 smoothes, at step ST5, the coefficients in the frequency band higher than the frequency Fa(t) from among the correction coefficients β(f, t) calculated by the correction coefficient calculation section 107 in the frequency direction to produce changed correction coefficient β'(f, t) of the frequencies f. After the processing at step ST5, the correction coefficient changing section 108 ends the processing at step ST6.

On the other hand, if the flag is off at step ST4, then the correction coefficient changing section 108 replaces, at step ST7, those correction coefficients in the frequency band higher than the frequency Fa(t) from among the correction coefficients β(f, t) calculated by the correction coefficient calculation section 107 into "1" to produce correction coefficients β'(f, t). After the processing at step ST7, the correction coefficient changing section 108 ends the processing at step ST6.

Referring back to FIG. 1, the inverse fast Fourier transform (IFFT) section 110 carries out an inverse fast Fourier transform process for a noise suppression signal Y(f, t) outputted from the post filtering section 109 for each frame. In particular, the inverse fast Fourier transform section 110 carries out processing reverse to that of the fast Fourier transform section 104 described hereinabove to convert a frequency domain signal into a time domain signal to produce a framed signal.

The waveform synthesis section 111 synthesizes framed signals of the frames produced by the inverse fast Fourier transform section 110 to restore a sound signal which is continuous in a time series. The waveform synthesis section 111 configures a frame synthesis section. The waveform synthesis section 111 outputs a noise-suppressed sound signal SAout as an output of the sound inputting system 100.

Action of the sound inputting system 100 shown in FIG. 1 is described briefly. The microphones 101*a* and 101*b* disposed in a juxtaposed relationship with a predetermined distance therebetween collect ambient sound to produce observation signals. The observation signals produced by the microphones 101*a* and 101*b* are converted from analog signals into digital signals by the A/D converter 102 and then supplied to the frame dividing section 103. Then, the observation signals from the microphones 101*a* and 101*b* are divided into frames of a predetermined time length by the frame dividing section 103.

The framed signals of the frames produced by framing by the frame dividing section 103 are successively supplied to the fast Fourier transform section 104. The fast Fourier transform section 104 carries out a fast Fourier transform (FFT) process for the framed signals to produce an observation signal $X_1(f, t)$ of the microphone 101*a* and an observation signal $X_2(f, t)$ of the microphone 101*b* as signals in the frequency domain.

The observation signals $X_1(f, t)$ and $X_2(f, t)$ produced by the fast Fourier transform section 104 are supplied to the object sound emphasis section 105. The object sound emphasis section 105 carries out a DS process or an adaptive beam former process, which are known already, for the observation signals $X_1(f, t)$ and $X_2(f, t)$ so that an object sound estimation signal Z(f, t) is produced for each frequency for each frame. For example, in the case where the DS process is used, the observation signal $X_1(f, t)$ and the observation signal $X_2(f, t)$ are added first, and then the sum is divided by 2 to produce an object sound estimation signal Z(f, t) (refer to the expression (3) given hereinabove).

Further, the observation signals $X_1(f, t)$ and $X_2(f, t)$ produced by the fast Fourier transform section 104 are supplied to the noise estimation section 106. The noise estimation section 106 carries out a NBF process or an adaptive beam former process, which are known already, for the observation signals $X_1(f, t)$ and $X_2(f, t)$ so that a noise estimation signal N(f, t) is produced for each frequency for each frame. For example, if the NBF process is used, then the observation signal $X_1(f, t)$ and the observation signal $X_2(f, t)$ are added first, and then the sum is divided by 2 to produce an object sound estimation signal N(f, t) (refer to the expression (4) given hereinabove).

The object sound estimation signal Z(f, t) produced by the object sound emphasis section 105 and the noise estimation signal N(f, t) produced by the noise estimation section 106 are supplied to the correction coefficient calculation section 107. The correction coefficient calculation section 107 calculates a correction coefficient β(f, t) for correcting a post filtering process for each frequency for each frame based on the object sound estimation signal Z(f, t) and the noise estimation signal N(f, t) (refer to the expression (5) given hereinabove).

The correction coefficients β(f, t) calculated by the correction coefficient calculation section 107 are supplied to the correction coefficient changing section 108. The correction coefficient changing section 108 changes those of the correction coefficients β(f, t) calculated by the correction coefficient calculation section 107 which belong to a frequency band which suffers from spatial aliasing such that a peak which appears at a particular frequency is suppressed thereby to produce changed correction coefficients β'(f, t).

The correction coefficient changing section 108 checks the correction coefficients β(f, t) calculated by the correction coefficient calculation section 107 to find out a first frequency Fa(t) on the low frequency side at which the value of the coefficient exhibits a drop and decides that the frequency band higher than the frequency Fa(t) suffers from spatial aliasing. Then, the correction coefficient changing section 108 changes those of the correction coefficients β(f, t) calculated by the correction coefficient calculation section 107 which belong to the frequency band higher than the frequency Fa(t) so that a peak which appears at the particular frequency is suppressed.

For example, the correction coefficient changing section 108 smoothes those of the correction coefficients β(f, t) calculated by the correction coefficient calculation section 107 which belong to the frequency band higher than the frequency Fa(t) in the frequency direction to produce changed correction coefficients β'(f, t) for the individual frequencies (refer to FIGS. 12 and 13). Or the correction coefficient changing section 108 replaces those of the correction coefficients β(f, t) calculated by the correction coefficient calculation section 107 which belong to the frequency band higher than the frequency Fa(t) into 1 to produce changed correction coefficients β'(f, t) (refer to FIG. 14).

The object sound estimation signal Z(f, t) produced by the object sound emphasis section 105 and the noise estimation signal N(f, t) produced by the noise estimation section 106 are supplied to the post filtering section 109. Also the correction coefficients β'(f, t) changed by the correction coefficient changing section 108 are supplied to the post filtering section 109. The post filtering section 109 carries out a post filtering process using the noise estimation signal N(f, t) to remove noise components remaining in the object sound estimation signal Z(f, t). The correction coefficients β'(f, t) are used to correct this post filtering process, that is to adjust the gain of noise components remaining in the object sound estimation signal Z(f, t) and the gain of the noise estimation signal N(f, t) to each other.

The post filtering section 109 uses a known technique such as, for example, a spectrum subtraction method or a MMSE-STSA method to produce a noise suppression signal Y(f, t). For example, in the case where the spectrum subtraction method is used, the noise suppression signal Y(f, t) is determined in accordance with the following expression (7):

$$Y(f,t)=Z(f,t)-\beta'(f,t)*N(f,t) \quad (7)$$

The noise suppression signal Y(f, t) of each frequency outputted for each frame from the post filtering section 109 is supplied to the inverse fast Fourier transform section 110. The inverse fast Fourier transform section 110 carries out an inverse fast Fourier transform process for the noise suppression signals Y(f, t) of the frequencies for each frame to produce framed signals converted into time domain signals. The framed signals for each frame are successively supplied to the waveform synthesis section 111. The waveform synthesis section 111 synthesizes the framed signals for each frame to produce a noise-suppressed sound signal SAout as an output of the sound inputting system 100 which is continuous in a time series.

As described hereinabove, in the sound inputting system 100 shown in FIG. 1, the correction coefficients β(f, t) calculated by the correction coefficient calculation section 107 are changed by the correction coefficient changing section 108. In this instance, those of the correction coefficients β(f, t) calculated by the correction coefficient calculation section 107 which belong to a frequency band which suffers from spatial aliasing, that is, to the frequency band higher than the frequency Fa(t), are changed such that a peak appearing at a particular frequency is suppressed to produce changed correction coefficients β'(f, t). The post filtering section 109 uses the changed correction coefficients β'(f, t).

Therefore, an otherwise possible bad influence of a peak of a coefficient, which appears at the particular frequency in the frequency band which suffers from spatial aliasing, on the output sound can be reduced, and deterioration of the sound quality can be suppressed. Consequently, a noise removing process which does not rely upon the microphone distance can be achieved. Accordingly, even if the microphones 101*a* and 101*b* are noise canceling microphones installed in a headphone and the distance between the microphones is great, correction against noise can be carried out efficiently and a good noise removing process which provides little distortion can be anticipated.

2. Second Embodiment

Example of a Configuration of the Sound Inputting System

Figure 16:
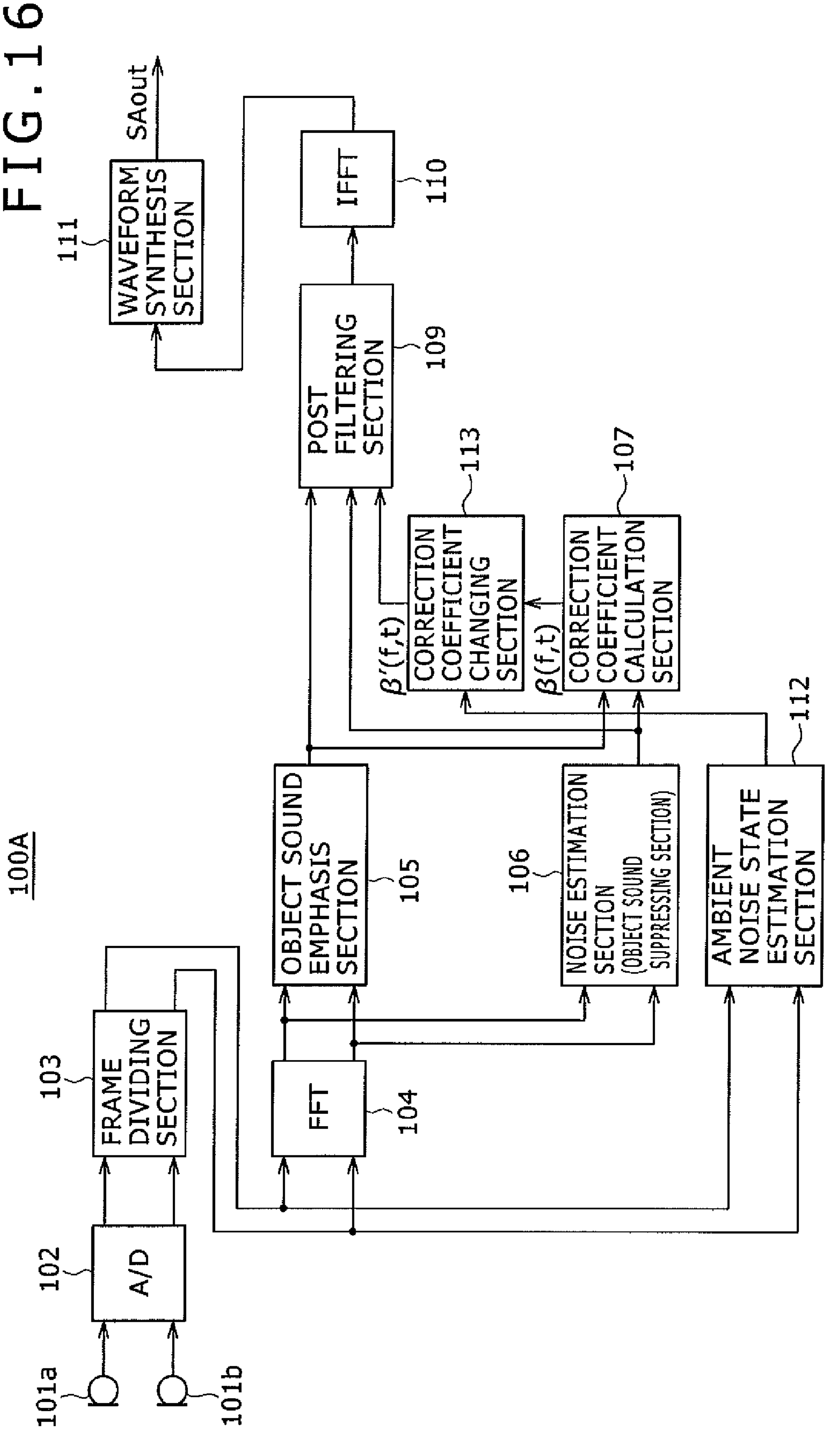
FIG. 16 is a block diagram showing an example of a configuration of a sound inputting system according to a second embodiment of the technology disclosed herein.

FIG. 16 shows an example of a configuration of a sound inputting system 100A according to a second embodiment.

Also the sound inputting system 100A carries out sound inputting using microphones for noise cancellation installed in left and right headphone portions of a noise canceling headphone.

Referring to FIG. 1, the sound inputting system 100A includes a pair of microphones 101*a* and 101*b*, an A/D converter 102, a frame dividing section 103, a fast Fourier transform section (FFT) 104, an object sound emphasis section 105, and a noise estimation section 106. The sound inputting system 100A further includes a correction coefficient calculation section 107, a post filtering section 109, an inverse fast Fourier transform (IFFT) section 110, a waveform synthesis section 111, an ambient noise state estimation section 112, and a correction coefficient changing section 113.

The ambient noise state estimation section 112 processes observation signals of the microphones 101*a* and 101*b* to produce sound source number information of ambient noise. In particular, the ambient noise state estimation section 112 calculates a correlation coefficient corr of the observation signal of the microphone 101*a* and the observation signal of the microphone 101*b* for each frame in accordance with an expression (8) given below and determines the correlation coefficient corr as sound source number information of ambient noise.

$$\mathrm{corr} = \frac{\sum_{n=1}^{N} \{x_1(n) - \bar{x}_1\}\{x_2(n) - \bar{x}_2\}}{\sqrt{\sum_{n=1}^{N} \{x_1(n) - \bar{x}_1\}^2}\sqrt{\sum_{n=1}^{N} \{x_2(n) - \bar{x}_2\}^2}} \tag{8}$$

where $x_1(n)$ represents time axis data of the microphone 101*a*, $x_2(n)$ time axis data of the microphone 101*b*, and N the sample number.

Figure 17:
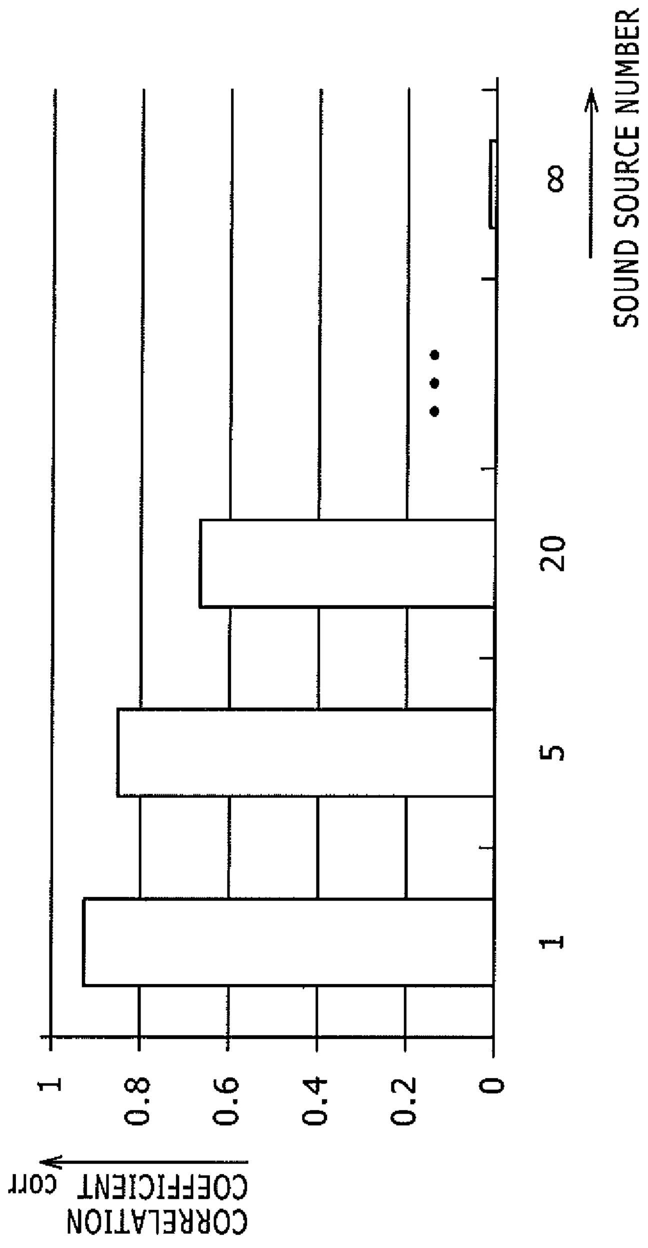
FIG. 17 is a bar graph illustrating an example of a relationship between the number of sound sources of noise and the correlation coefficient.

A bar graph of FIG. 17 illustrates an example of a relationship between the sound source number of noise and the correlation coefficient corr. Generally, as the number of sound sources increases, the correlation between the observation signals of the microphones 101*a* and 101*b* drops. Theoretically, as the number of sound sources increases, the correlation coefficient corr approaches 0. Therefore, the number of sound sources of ambient noise can be estimated from the correlation coefficient corr.

Referring back to FIG. 16, the correction coefficient changing section 113 changes correction coefficients β(f, t) calculated by the correction coefficient calculation section 107 based on the correlation coefficient corr produced by the ambient noise state estimation section 112, which is sound source number information of ambient noise, for each frame. In particular, as the sound source number increases, the correction coefficient changing section 113 increases the smoothed frame number to smooth the coefficients calculated by the correction coefficient calculation section 107 in the frame direction to produce changed correction coefficients β'(f, t). The post filtering section 109 actually uses not the correction coefficients β(f, t) themselves calculated by the correction coefficient calculation section 107 but the changed correction coefficients β'(f, t).

Figure 18:
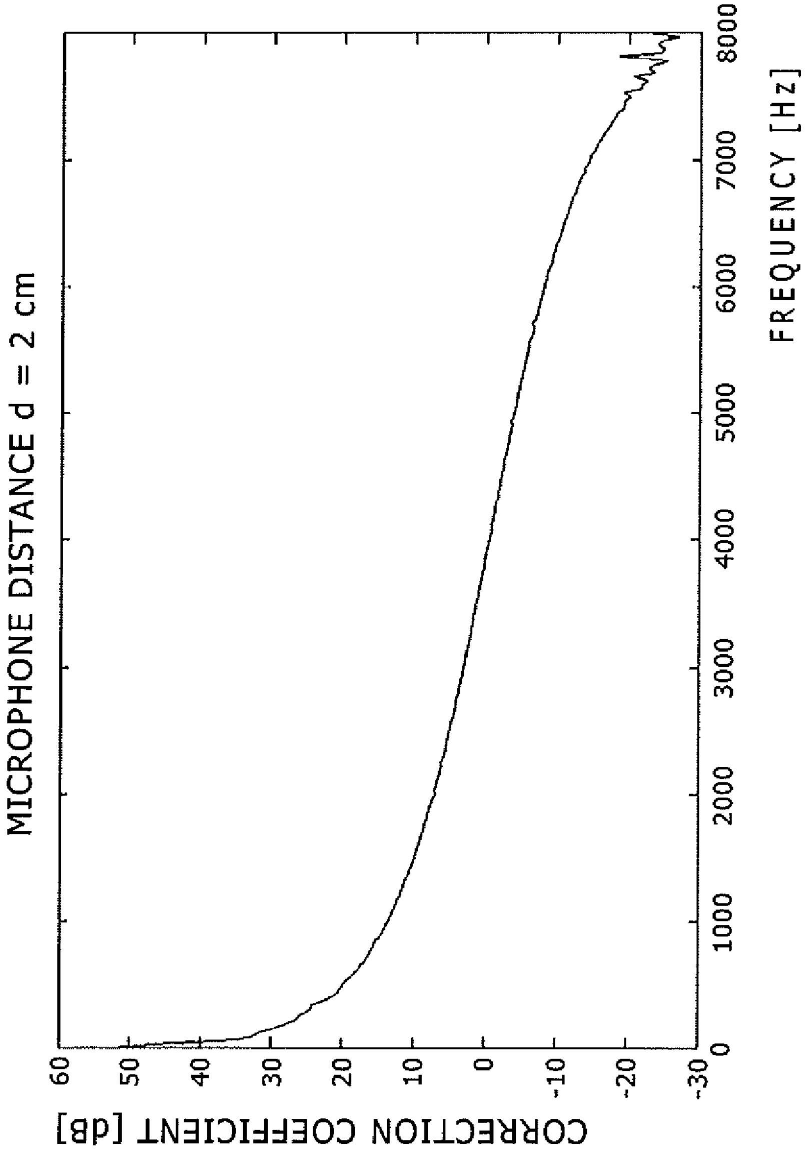
FIG. 18 is a diagram illustrating an example of a correction coefficient for each frequency calculated by a correlation coefficient calculation section shown in FIG. 16 where a noise source exists in a direction of 45° and the microphone distance is 2 cm.
Figure 19:
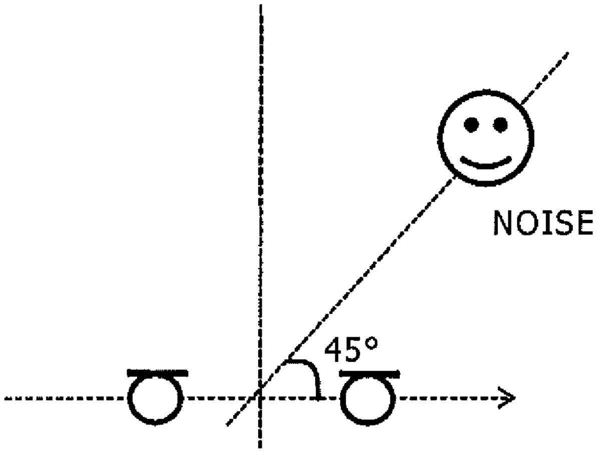
FIG. 19 is a diagrammatic view showing a noise source existing in a direction of 45°.
Figure 20:
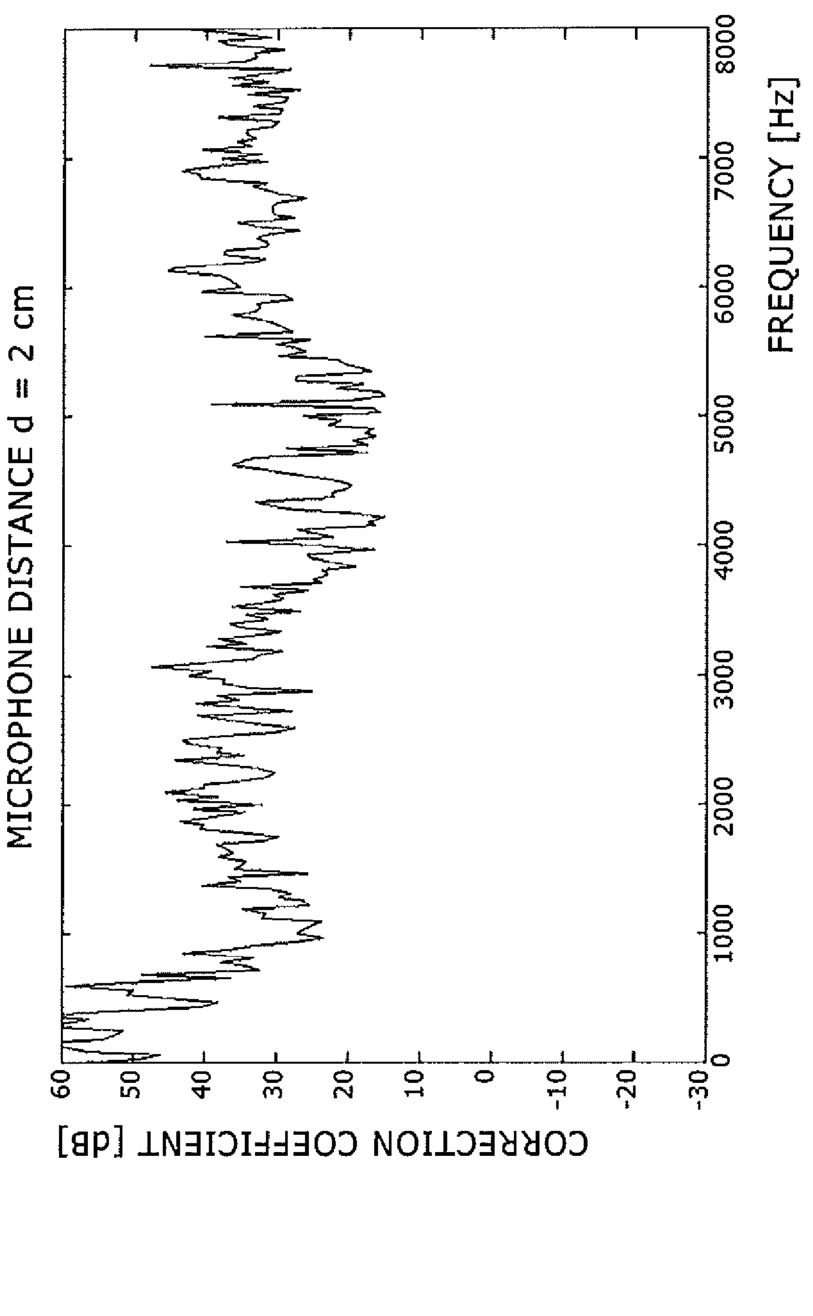
FIG. 20 is a diagram illustrating an example of a correction coefficient for each frequency calculated by the correlation coefficient calculation section shown in FIG. 16 where a plurality of noise sources exist in different directions and the microphone distance is 2 cm.
Figure 21:
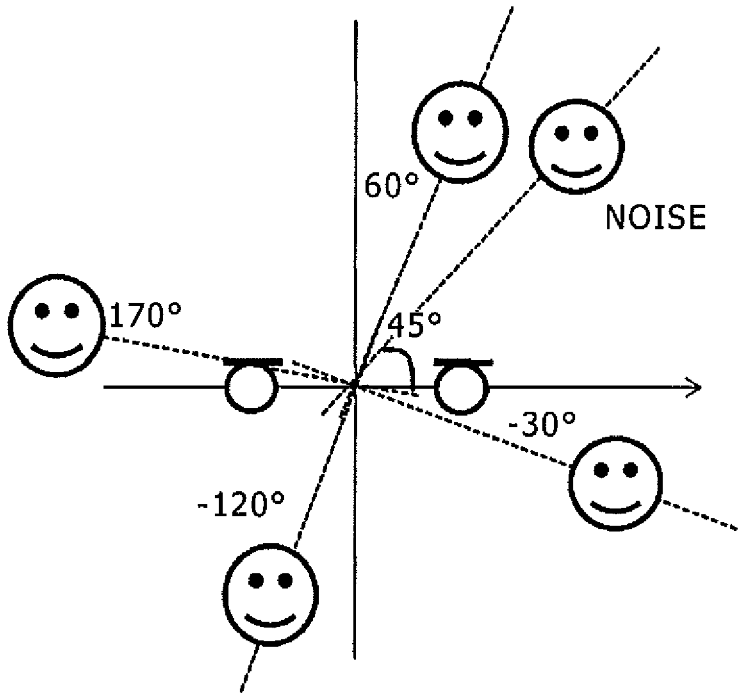
FIG. 21 is a diagrammatic view showing a plurality of noise sources existing in different directions.
Figure 22:
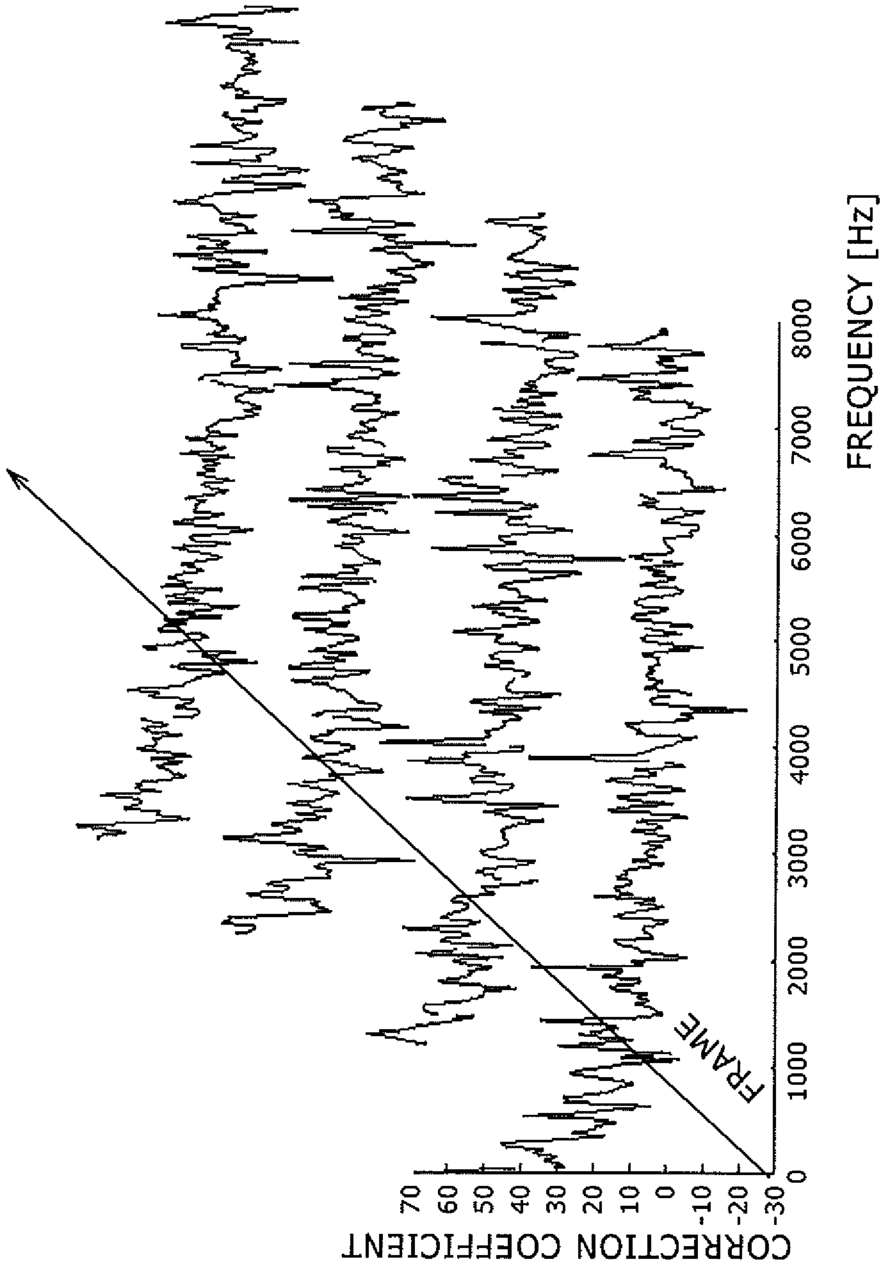
FIG. 22 is a diagram illustrating that a correction coefficient calculated by the correction coefficient calculation section shown in FIG. 16 changes at random among different frames.

FIG. 18 illustrates an example of the correction coefficient in the case where a noise source exists in the direction of 45° and the microphone distance d is 2 cm as seen in FIG. 19. In contrast, FIG. 20 illustrates an example of the correlation coefficient in the case where a plurality of noise sources exist in different directions and the microphone distance d is 2 cm. Even if the microphone distance is an appropriate distance with which spatial aliasing does not occur in this manner, as the sound source number of noise increases, the correction coefficient becomes less stable. Consequently, the correction coefficient varies at random among frames as seen in FIG. 22. If this correction coefficient is used as it is, then this has a bad influence on the output sound and degrades the sound quality.

Figure 23:
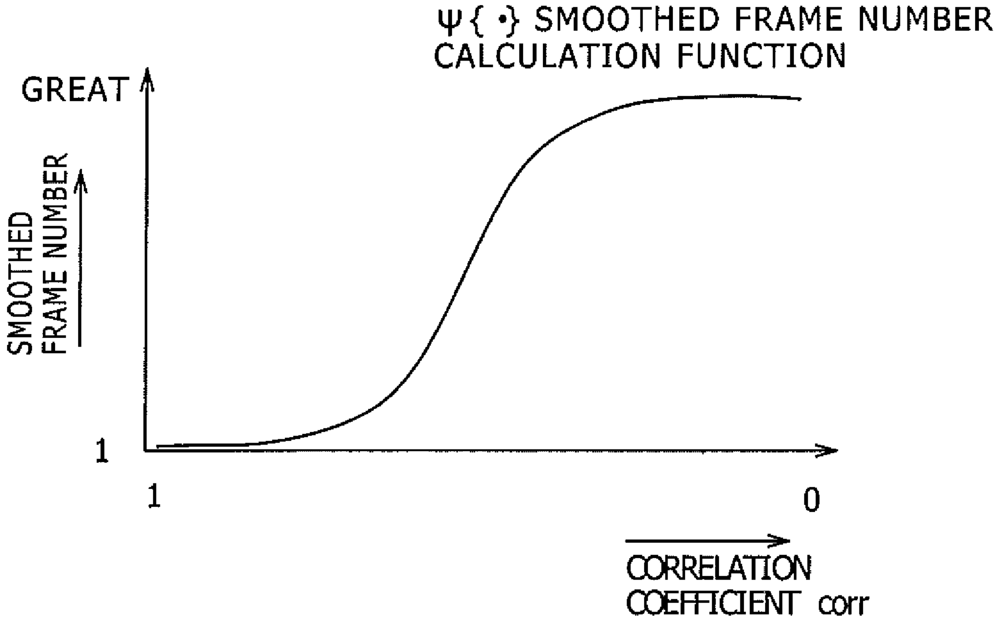
FIG. 23 is a diagram illustrating an example of a smoothed frame number calculation function used when a smoothed frame number is determined based on a correlation coefficient which is sound source number information of ambient noise.

The correction coefficient changing section 113 calculates a smoothed frame number γ based on the correlation coefficient corr produced by the ambient noise state estimation section 112, which is sound source number information of ambient noise. In particular, the correction coefficient changing section 113 determines the smoothed frame number γ using, for example, such a smoothed frame number calculation function as illustrated in FIG. 23. In this instance, when the correlation between the observation signals of the microphones 101*a* and 101*b* is high, or in other words, when the value of the correlation coefficient corr is high, the determined smoothed frame number γ is small.

On the other hand, when the correlation between the observation signals of the microphones 101*a* and 101*b* is low, that is, when the value of the correlation coefficient corr is low, the determined smoothed frame number γ is great. It is to be noted that the correction coefficient changing section 113 need not actually carry out an arithmetic operation process but may read out a smoothed frame number γ based on the correlation coefficient corr from a table in which a corresponding relationship between the correlation coefficient corr and the smoothed frame number γ is stored.

Figure 24:
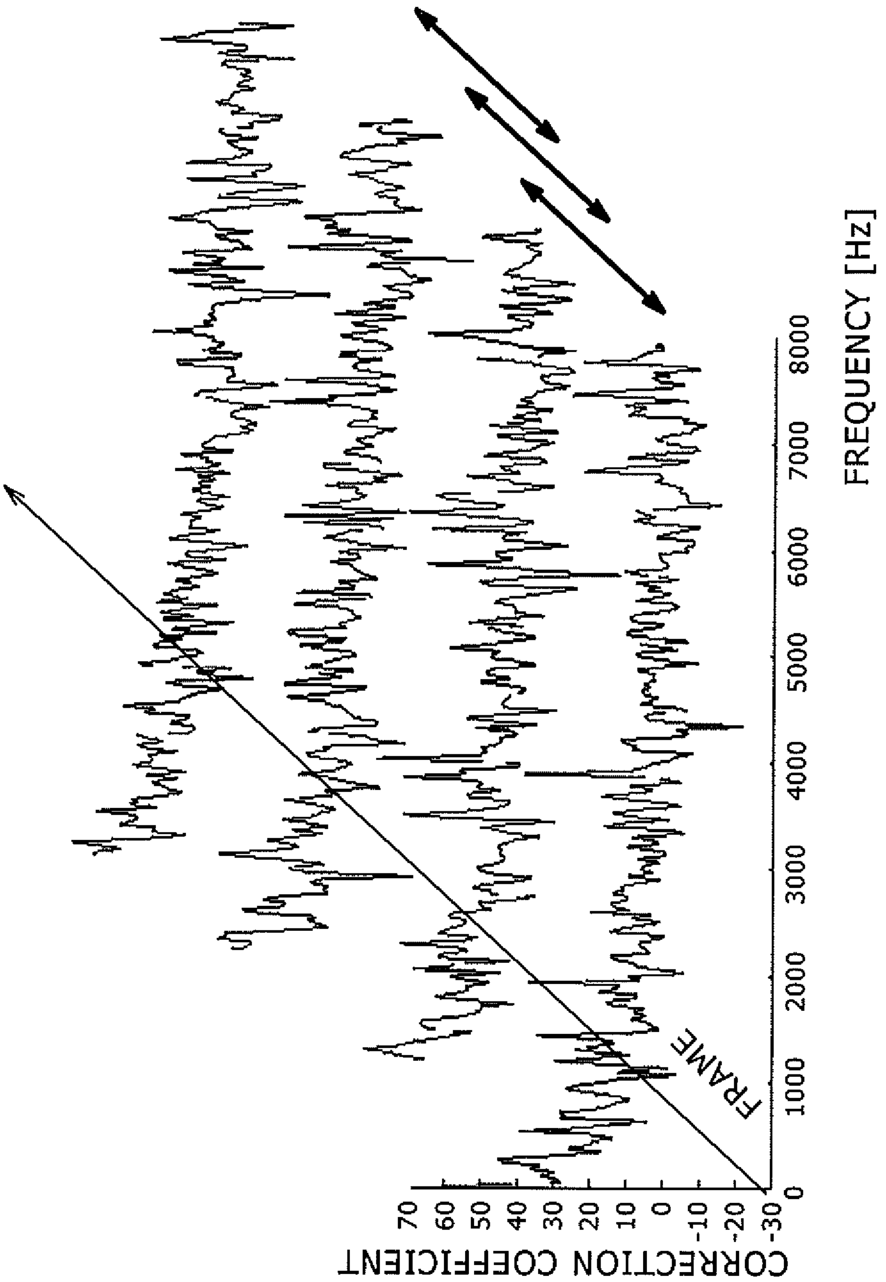
FIG. 24 is a diagram illustrating smoothing of correction coefficients calculated by the correction coefficient calculation section shown in FIG. 16 in a frame or time direction to obtain changed correction coefficients.

The correction coefficient changing section 113 smoothes the correction coefficients β(f, t) calculated by the correction coefficient calculation section 107 in the frame direction, that is, in the time direction, for each frame as seen in FIG. 24 to produce a changed correction coefficient β'(f, t) for each frame. In this instance, smoothing is carried out with the smoothed frame number γ determined in such a manner as described above. The correction coefficients β'(f, t) for the frames changed in this manner exhibit a moderate variation in the frame direction, that is, in the time direction.

Figure 25:
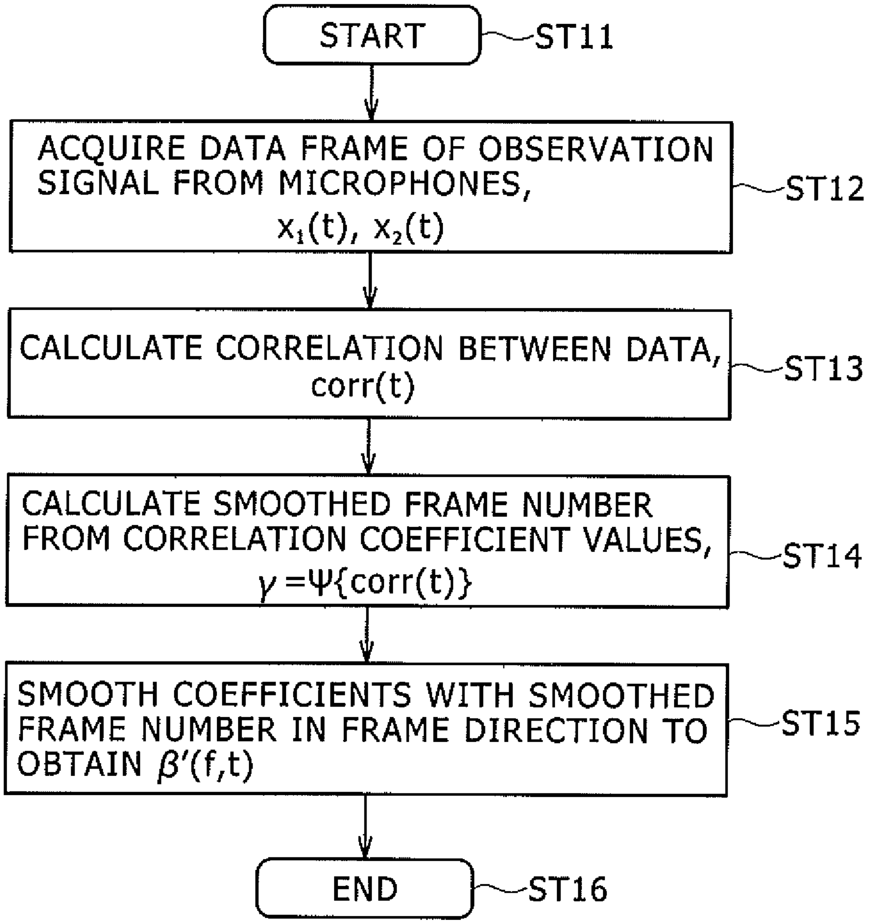
FIG. 25 is a flow chart illustrating a procedure of processing by an ambient noise state estimation section and a correction coefficient changing section shown in FIG. 16.

A flow chart of FIG. 25 illustrates a procedure of processing by the ambient noise state estimation section 112 and the correction coefficient changing section 113 for one frame. Referring to FIG. 25, the ambient noise state estimation section 112 and the correction coefficient changing section 113 start their processing at step ST11. Then at step ST12, the ambient noise state estimation section 112 acquires data frames $x_1(t)$ and $x_2(t)$ of the observation signals of the microphones 101*a* and 101*b*. Then at step ST13, the ambient noise state estimation section 112 calculates a correlation coefficient corr(t) representative of a degree of the correlation between the observation signals of the microphones 101*a* and 101*b* (refer to the expression (8) given hereinabove).

Then at step ST14, the correction coefficient changing section 113 uses the value of the correlation coefficient corr(t) calculated by the ambient noise state estimation section 112 at step ST13 to calculate a smoothed frame number γ in accordance with the smoothed frame number calculation function (refer to FIG. 23). Then at step ST15, the correction coefficient changing section 113 smoothes the correction coefficients β(f, t) calculated by the correction coefficient calculation section 107 with the smoothed frame number γ calculated at step ST14 to produce a changed correction coefficient β'(f, t). After the processing at step ST15, the ambient noise state estimation section 112 and the correction coefficient changing section 113 end the processing.

Although detailed description is omitted herein, the other part of the sound inputting system 100A shown is configured similarly to that of the sound inputting system 100 described hereinabove with reference to FIG. 1.

Action of the sound inputting system 100A shown in FIG. 16 is described briefly. The microphones 101*a* and 101*b* disposed in a juxtaposed relationship with a predetermined distance therebetween collect ambient sound to produce observation signals. The observation signals produced by the microphones 101*a* and 101*b* are converted from analog signals into digital signals by the A/D converter 102 and the supplied to the frame dividing section 103. The frame dividing section 103 divides the observation signals from the microphones 101*a* and 101*b* into frames of a predetermined time length.

The framed signals of the frames produced by the framing by the frame dividing section 103 are successively supplied to the fast Fourier transform section 104. The fast Fourier transform section 104 carries out a fast Fourier transform (FFT) process for the framed signals to produce an observation signal $X_1(f, t)$ of the microphone 101*a* and an observation signal $X_2(f, t)$ of the microphone 101*b* as signals in the frequency domain.

The observation signals $X_1(f, t)$ and $X_2(f, t)$ produced by the fast Fourier transform section 104 are supplied to the object sound emphasis section 105. The object sound emphasis section 105 carries out a DS process, an adaptive beam former process or the like, which are known already, for the observation signals $X_1(f, t)$ and $X_2(f, t)$ to produce an object sound estimation signal Z(f, t) for each frequency for each frame. For example, in the case where the DS process is used, the object sound emphasis section 105 carries out an addition process of the observation signal $X_1(f, t)$ and the observation signal $X_2(f, t)$ and then divides the sum by 2 to produce an object sound estimation signal Z(f, t) (refer to the expression (3) given hereinabove).

Further, the observation signals $X_1(f, t)$ and $X_2(f, t)$ produced by the fast Fourier transform section 104 are supplied to the noise estimation section 106. The noise estimation section 106 carries out a NBF process, an adaptive beam former process or the like, which are known already, for the observation signals $X_1(f, t)$ and $X_2(f, t)$ to produce a noise estimation signal N(f, t) for each frequency for each frame. For example, in the case where the NBF process is used, the noise estimation section 106 carries out a subtraction process between the observation signal $X_1(f, t)$ and the observation signal $X_2(f, t)$ and then divides the difference by 2 to produce the noise estimation signal N(f, t) (refer to the expression (4) given hereinabove).

The object sound estimation signal Z(f, t) produced by the object sound emphasis section 105 and the noise estimation signal N(f, t) produced by the noise estimation section 106 are supplied to the correction coefficient calculation section 107. The correction coefficient calculation section 107 calculates a correction coefficient β(f, t) for correction of a post filtering process for each frequency for each frame based on the object sound estimation signal Z(f, t) and the noise estimation signal N(f, t) (refer to the expression (5) given hereinabove).

The framed signals of the frames produced by the framing by the frame dividing section 103, that is, the observation signals $x_1(n)$ and $x_2(n)$ of the microphones 101*a* and 101*b*, are supplied to the ambient noise state estimation section 112. The ambient noise state estimation section 112 determines a correlation coefficient corr between the observation signals $x_1(n)$ and $x_2(n)$ of the microphones 101*a* and 101*b* as sound source information of ambient noise (refer to the expression (8)).

The correction coefficients β(f, t) calculated by the correction coefficient calculation section 107 are supplied to the correction coefficient changing section 113. Also the correlation coefficient corr produced by the ambient noise state estimation section 112 is supplied to the correction coefficient changing section 113. The correction coefficient changing section 113 changes the correction coefficient β(f, t) calculated by the correction coefficient calculation section 107 based on the correlation coefficient corr produced by the ambient noise state estimation section 112, that is, based on the sound source number information of ambient noise, for each frame.

First, the correction coefficient changing section 113 determines a smoothed frame number based on the correlation coefficient corr. In this instance, the smoothed frame number γ is determined such that it is small when the value of the correlation coefficient corr is high but is great when the value of the correlation coefficient corr is low (refer to FIG. 23). Then, the correction coefficient changing section 113 smoothes the correction coefficients β(f, t) calculated by the correction coefficient calculation section 107 in the frame direction, that is, in the time direction, with the smoothed frame number γ to produce a changed correction coefficient β'(f, t) of each frame (refer to FIG. 24).

The object sound estimation signal Z(f, t) produced by the object sound emphasis section 105 and the noise estimation signal N(f, t) produced by the noise estimation section 106 are supplied to the post filtering section 109. Also the correction coefficients β'(f, t) changed by the correction coefficient changing section 113 are supplied to the post filtering section 109. The post filtering section 109 removes noise components remaining in the object sound estimation signal Z(f, t) by a post filtering process using the noise estimation signal N(f, t). The correction coefficient β'(f, t) is used to correct this post filtering process, that is, to adjust the gain of noise components remaining in the object sound estimation signal Z(f, t) and the gain of the noise estimation signal N(f, t) to each other.

The post filtering section 109 uses a known technique such as, for example, a spectrum subtraction method or a MMSE-STSA method to produce a noise suppression signal Y(f, t). For example, in the case where the spectrum subtraction method is used, the noise suppression signal Y(f, t) is determined in accordance with the following expression (9):

$$Y(f,t)=Z(f,t)-\beta'(f,t)*N(f,t) \tag{9}$$

The noise suppression signal Y(f, t) of each frequency outputted for each frame from the post filtering section 109 is supplied to the inverse fast Fourier transform section 110. The inverse fast Fourier transform section 110 carries out an inverse fast Fourier transform process for the noise suppression signals Y(f, t) of the frequencies for each frame to produce framed signals converted into time domain signals. The framed signals for each frame are successively supplied to the waveform synthesis section 111. The waveform synthesis section 111 synthesizes the framed signals of each frame to produce a noise-suppressed sound signal SAout as an output of the sound inputting system 100 which is continuous in a time series.

As described hereinabove, in the sound inputting system 100A shown in FIG. 16, the correction coefficients β(f, t) calculated by the correction coefficient calculation section 107 are changed by the correction coefficient changing section 113. In this instance, the ambient noise state estimation section 112 produces correlation coefficients corr of the observation signals $x_1(n)$ and $x_2(n)$ of the microphones 101*a* and 101*b* as sound source number information of ambient noise. Then, the correction coefficient changing section 113 determines a smoothed frame number γ based on the sound source information such that the smoothed frame number γ becomes great as the sound source number increases. Then, the correction coefficients β(f, t) are smoothed in the frame direction to produce changed correction coefficients β'(f, t) for each frame. The post filtering section 109 uses the changed correction coefficients β'(f, t).

Therefore, in a situation in which a plurality of noise sources exist around an object sound source, the variation of the correction coefficient in the frame direction, that is, in the time direction, is suppressed to decrease the influence on the output sound. Consequently, a noise removing process suitable for a situation of ambient noise can be anticipated. Accordingly, even in the case where the microphones 101*a* and 101*b* are noise canceling microphones installed in a headphone and a plurality of noise sources exist around an object sound source, correction against noise can be carried out efficiently, and a good noise removing process which provides little distortion is carried out.

3. Third Embodiment

Example of a Configuration of the Sound Inputting System

Figure 26:
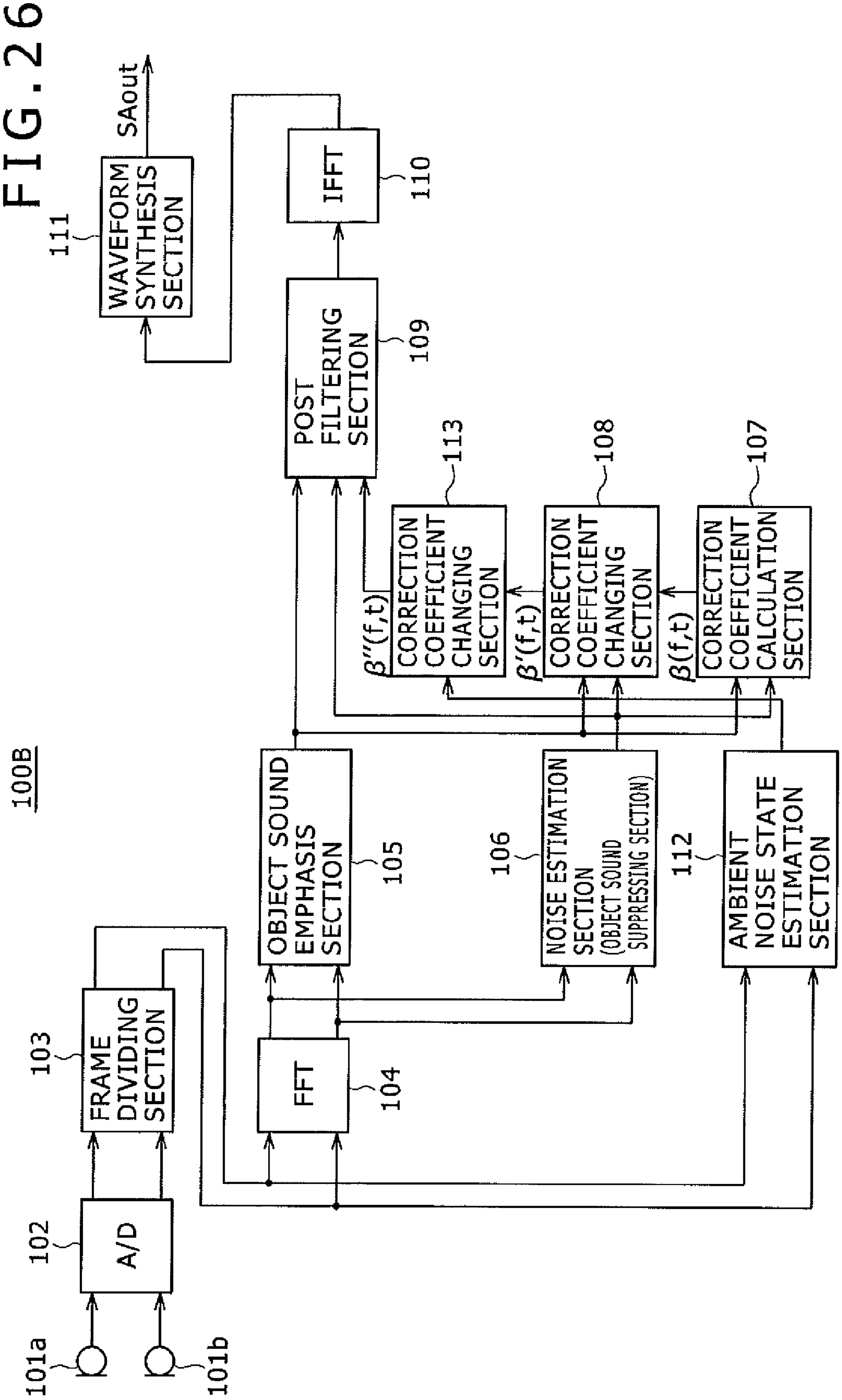
FIG. 26 is a block diagram showing an example of a configuration of a sound inputting system according to a third embodiment of the technology disclosed herein.

FIG. 26 shows an example of a configuration of a sound inputting system 100B according to a third embodiment. Also this sound inputting system 100B carries out sound inputting using microphones for noise cancellation installed in left and right headphone portions of a noise canceling headphone similarly to the sound inputting systems 100 and 100A described hereinabove with reference to FIGS. 1 and 16, respectively.

Referring to FIG. 26, the sound inputting system 100B shown includes a pair of microphones 101*a* and 101*b*, an A/D converter 102, a frame dividing section 103, a fast Fourier transform (FFT) section 104, an object sound emphasis section 105, a noise estimation section 106, and a correction coefficient calculation section 107. The sound inputting system 100B further includes a correction coefficient changing section 108, a post filtering section 109, an inverse fast Fourier transform (IFFT) section 110, a waveform synthesis section 111, an ambient noise state estimation section 112, and a correction coefficient changing section 113.

The correction coefficient changing section 108 changes those of the correction coefficients β(f, t) calculated by the correction coefficient calculation section 107 which belong to a frequency band which suffers from spatial aliasing for each frame so that a peak which appears at a particular frequency is suppressed to produce correction coefficients β'(f, t). Although detailed description is omitted herein, the correction coefficient changing section 108 is similar to the correction coefficient changing section 108 in the sound inputting system 100 described hereinabove with reference to FIG. 1. The correction coefficient changing section 108 configures a first correction coefficient changing section.

The ambient noise state estimation section 112 calculates a correlation coefficient corr between the observation signals of the microphone 101*a* and the observation signals of the microphone 101*b* for each frame as sound source number information of ambient noise. Although detailed description is omitted herein, the ambient noise state estimation section 112 is similar to the ambient noise state estimation section 112 in the sound inputting system 100A described hereinabove with reference to FIG. 16.

The correction coefficient changing section 113 further changes the correction coefficients β'(f, t) changed by the correction coefficient changing section 108 based on the correlation coefficients corr produced by the ambient noise state estimation section 112, which is sound source number information of ambient noise, to produce correction coefficients β"(*f, t*). Although detailed description is omitted herein, the correction coefficient changing section 113 is similar to the correction coefficient changing section 113 in the sound inputting system 100A described hereinabove with reference to FIG. 16. The correction coefficient changing section 113 configures a second correction coefficient changing section. The post filtering section 109 actually uses not the correction coefficients β(f, t) calculated by the correction coefficient calculation section 107 but the changed correction coefficients β"(*f, t*).

Although detailed description of the other part of the sound inputting system 100B shown in FIG. 26 is omitted herein, it is configured similarly to that in the sound inputting systems 100 and 100A described hereinabove with reference to FIGS. 1 and 16, respectively.

Figure 27:
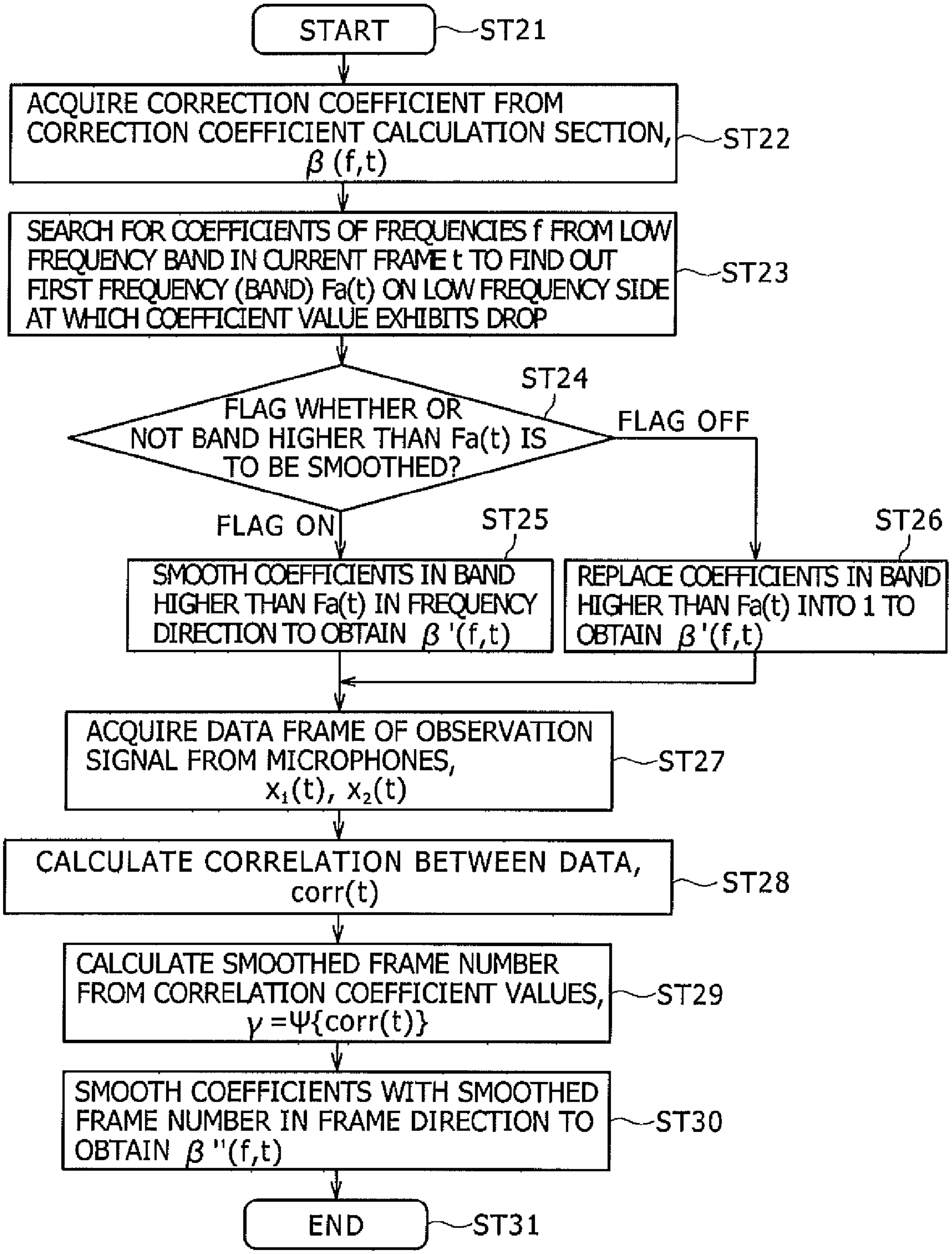
FIG. 27 is a flow chart illustrating a procedure of processing by a correction coefficient changing section, an ambient noise state estimation section and a correction coefficient changing section shown in FIG. 26.

A flow chart of FIG. 27 illustrates a procedure of processing by the correction coefficient changing section 108, ambient noise state estimation section 112 and correction coefficient changing section 113 for one frame. Referring to FIG. 27, the correction coefficient changing section 108, ambient noise state estimation section 112 and correction coefficient changing section 113 start their processing at step ST21. Then at step ST22, the correction coefficient changing section 108 acquires correction coefficients β(f, t) from the correction coefficient calculation section 107. Then at step ST23, the correction coefficient changing section 108 searches for coefficients for frequencies f in the current frame t from within a low frequency region to find out a first frequency Fa(t) on the low frequency side at which the value of the coefficient exhibits a drop.

Then at step ST24, the correction coefficient changing section 108 checks a flag representative of whether or not the frequency band higher than frequency Fa(t), that is, the frequency band which suffers from spatial aliasing, should be smoothed. It is to be noted that this flag is set in advance by an operation of the user. If the flag is on, then the correction coefficient changing section 108 smoothes, at step ST25, the coefficients in the frequency band higher than the frequency Fa(t) from among the correction coefficients β(f, t) calculated by the correction coefficient calculation section 107 in the frequency direction to produce changed correction coefficients β'(f, t) of the frequencies f. On the other hand, if the flag is off at step ST24, then the correction coefficient changing section 108 replaces, at step ST27, those of the correction coefficients β(f, t) calculated by the correction coefficient calculation section 107 which belong to the frequency band higher than the frequency Fa(t) into "1" to produce correction coefficients β'(f, t).

After the process at step ST25 or step ST26, the ambient noise state estimation section 112 acquires the data frames $x_1(t)$ and $x_2(t)$ of the observation signals of the microphones 101*a* and 101*b* at step ST27. Then at step ST28, the ambient noise state estimation section 112 calculates a correlation coefficient corr(t) indicative of a degree of correlation between the observation signals of the microphones 101*a* and 101*b* (refer to the expression (8) given hereinabove).

Then at step ST29, the correction coefficient changing section 113 uses the value of the correlation coefficient corr(t) calculated by the ambient noise state estimation section 112 at step ST28 to calculate a smoothed frame number γ in accordance with the smoothed frame number calculation function (refer to FIG. 23). Then at step ST30, the correction coefficient changing section 113 smoothes the correction coefficients β'(f, t) changed by the correction coefficient changing section 108 with the smoothed frame number γ calculated at step ST29 to produce changed correction coefficients β"(*f, t*). After the process at step ST30, the correction coefficient changing section 108, ambient noise state estimation section 112 and correction coefficient changing section 113 end the processing at step ST31.

Action of the sound inputting system 100B shown in FIG. 26 is described briefly. The microphones 101*a* and 101*b* disposed in a juxtaposed relationship with a predetermined distance left therebetween collect sound to produce observation signals. The observation signals produced by the microphones 101*a* and 101*b* are converted from analog signals into digital signals by the A/D converter 102 and then supplied to the frame dividing section 103. The frame dividing section 103 divides the observation signals from the microphones 101*a* and 101*b* into frames of a predetermined time length.

The framed signals of the frames produced by the framing by the frame dividing section 103 are successively supplied to the fast Fourier transform section 104. The fast Fourier transform section 104 carries out a fast Fourier transform (FFT) process for the framed signals to produce an observation signal $X_1$(f, t) of the microphone 101*a* and an observation signal $X_2$(f, t) of the microphone 101*b* as signals in the frequency domain.

The observation signals $X_1$(f, t) and $X_2$(f, t) produced by the fast Fourier transform section 104 are supplied to the object sound emphasis section 105. The object sound emphasis section 105 carries out a DS process, an adaptive beam former process or the like, which are known already, for the observation signals $X_1$(f, t) and $X_2$(f, t) to produce an object sound estimation signal Z(f, t) for each frequency for each frame. For example, in the case where the DS process is used, the object sound emphasis section 105 carries out an addition process of the observation signal $X_1$(f, t) and the observation signal $X_2$(f, t) and then divides the sum by 2 to produce an object sound estimation signal Z(f, t) (refer to the expression (3) given hereinabove).

The observation signals $X_1$(f, t) and $X_2$(f, t) produced by the fast Fourier transform section 104 are supplied to the noise estimation section 106. The noise estimation section 106 carries out a NBF process, an adaptive beam former process or the like, which are known already, for the observation signals $X_1$(f, t) and $X_2$(f, t) to produce a noise estimation signal N(f, t) for each frequency for each frame. For example, in the case where the NBF process is used, the noise estimation section 106 carries out a subtraction process between the observation signal $X_1$(f, t) and the observation signal $X_2$(f, t) and then divides the difference by 2 to produce a noise estimation signal N(f, t) (refer to the expression (4)).

The object sound estimation signal Z(f, t) produced by the object sound emphasis section 105 and the noise estimation signal N(f, t) produced by the noise estimation section 106 are supplied to the correction coefficient calculation section 107. The correction coefficient calculation section 107 calculates correction coefficients β(f, t) for correcting a post filtering process for each frequency for each frame based on the object sound estimation signal Z(f, t) and the noise estimation signal N(f, t) (refer to the expression (5)).

The correction coefficients β(f, t) calculated by the correction coefficient calculation section 107 are supplied to the correction coefficient changing section 108. The correction coefficient changing section 108 changes those of the correction coefficients β(f, t) calculated by the correction coefficient calculation section 107 which belong to the frequency band which suffers from spatial aliasing such that a peak which appears at a particular frequency is suppressed to produce changed correction coefficients β'(*f, t*).

Further, the framed signals of the frames produced by the framing by the frame dividing section 103, that is, the observation signals $x_1$(n) and $x_2$(n) of the microphones 101*a* and 101*b*, are supplied to the ambient noise state estimation section 112. The ambient noise state estimation section 112 determines correlation coefficients corr of the observation signals $x_1$(n) and $x_2$(n) of the microphones 101*a* and 101*b* as sound source number information of ambient noise (refer to the expression (8)).

The changed correction coefficients β'(f, t) produced by the correction coefficient changing section 108 are further supplied to the correction coefficient changing section 113. Also the correlation coefficients corr produced by the ambient noise state estimation section 112 are supplied to the correction coefficient changing section 113. The correction coefficient changing section 113 further changes the correction coefficients β'(f, t) produced by the correction coefficient changing section 108 based on the correlation coefficients corr produced by the ambient noise state estimation section 112, which is sound source number information of ambient noise, for each frame.

The correction coefficient changing section 113 first determines a smoothed frame number based on the correlation coefficients corr. In this instance, the smoothed frame number γ has a low value when the correlation coefficient corr has a high value but has a high value when the correlation coefficient corr has a low value (refer to FIG. 23). Then, the correction coefficient changing section 108 smoothes the correction coefficients β'(f, t) changed by the correction coefficient changing section 113 with the smoothed frame number γ in the frame direction or time direction to produce correction coefficients β"(*f, t*) for the individual frames (refer to FIG. 24).

The object sound estimation signal Z(f, t) produced by the object sound emphasis section 105 and the noise estimation signal N(f, t) produced by the noise estimation section 106 are supplied to the post filtering section 109. Also the correction coefficients β"(*f, t*) changed by the correction coefficient changing section 113 are supplied to the post filtering section 109. The post filtering section 109 removes noise components remaining in the object sound estimation signal Z(f, t) by a post filtering process using the noise estimation signal N(f, t). The correction coefficients β"(*f, t*) are used to correct the post filtering process, that is, to adjust the gain of the noise components remaining in the object sound estimation signal Z(f, t) and the gain of the noise estimation signal N(f, t) to each other.

The post filtering section 109 uses a known technique such as, for example, a spectrum subtraction method or a MMSE-STSA method to produce a noise suppression signal Y(f, t). For example, in the case where the spectrum subtraction method is used, the noise suppression signal Y(f, t) is determined, for example, in accordance with the following expression (10):

$$Y(f,t)=Z(f,t)-\beta''(f,t)*N(f,t) \tag{10}$$

The noise suppression signal Y(f, t) for each frequency outputted from the post filtering section 109 for each frame is supplied to the inverse fast Fourier transform section 110. The inverse fast Fourier transform section 110 carries out an inverse fast Fourier transform process for the noise suppression signal Y(f, t) for each frequency for each frame to produce framed signals converted into time domain signals. The framed signals of each frame are successively supplied to the waveform synthesis section 111. The waveform synthesis section 111 synthesizes the framed signals of each frame to produce a noise-suppressed sound signal SAout as an output of the sound inputting system 100 which is continuous in a time series.

As described hereinabove, in the sound inputting system 100B shown in FIG. 26, the correction coefficients β(f, t) calculated by the correction coefficient calculation section 107 are changed by the correction coefficient changing section 108. In this instance, those of the correction coefficients β(f, t) calculated by the correction coefficient calculation section 107 which belong to a frequency band which suffers from spatial aliasing, that is, to the frequency band higher than the frequency Fa(t), are changed such that a peak which appears at a particular frequency is suppressed to produce changed correction coefficients β'(f, t).

Further, in the sound inputting system 100B shown in FIG. 26, the correction coefficients β'(f, t) changed by the correction coefficient changing section 108 are further changed by the correction coefficient changing section 113. In this instance, by the ambient noise state estimation section 112, correlation coefficients corr of the observation signals $x_1(n)$ and $x_2(n)$ of the microphones 101*a* and 101*b* are produced as sound source number information of ambient noise. Then, the correction coefficient changing section 113 determines a smoothed frame number γ based on the sound source number information so that the smoothed frame number γ may have a higher value as the number of sound sources increases. Then, the correction coefficients β'(f, t) are smoothed in the frame direction with the smoothed frame number γ to produce changed correction coefficients β"(*f, t*) of the frames. The post filtering section 109 uses the changed correction coefficients β"(*f, t*).

Therefore, a bad influence of a peak of the coefficient appearing at a particular frequency in the frequency band which suffers from spatial aliasing on the output sound can be moderated and degradation of the sound quality can be suppressed. Consequently, a noise removing process which does not rely upon the microphone distance can be anticipated. Accordingly, even in the case where the microphones 101*a* and 101*b* are noise canceling microphones installed in a headphone and the microphone distance is great, correction against noise can be carried out efficiently, and a good noise removing process which provides little distortion is carried out.

Further, in a situation in which a large number of noise sources exist around an object sound source, a variation of the correction coefficient in a frame direction, that is, in a time direction can be suppressed to reduce the influence on the output sound. Consequently, a noise removing process suitable for a situation of ambient noise can be achieved. Accordingly, even if the microphones 101*a* and 101*b* are noise canceling microphones installed in a headphone and many noise sources exist around an object sound source, correction against noise can be carried out efficiently, and a good noise removing process which provides little distortion is carried out.

4. Fourth Embodiment

Example of a Configuration of the Sound Inputting System

Figure 28:
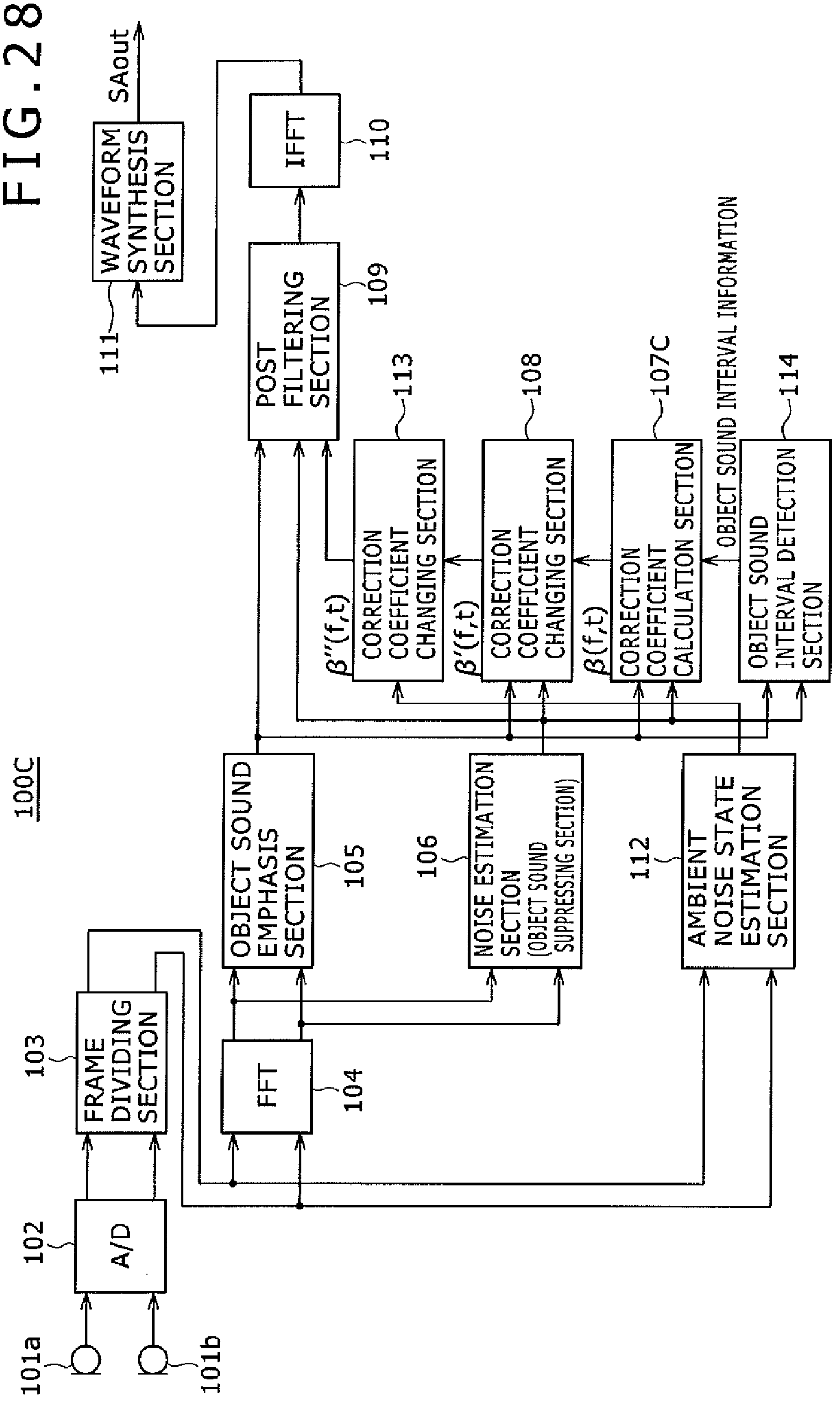
FIG. 28 is a block diagram showing an example of a configuration of a sound inputting system according to a fourth embodiment of the technology disclosed herein.

FIG. 28 shows an example of a configuration of a sound inputting system 100C according to a fourth embodiment. Also the sound inputting system 100C is a system which carries out sound inputting using noise canceling microphones installed in left and right headphone portions of a noise canceling headphone similarly to the sound inputting systems 100, 100A and 100B described hereinabove with reference to FIGS. 1, 16 and 26, respectively.

Referring to FIG. 28, the sound inputting system 100C includes a pair of microphones 101*a* and 101*b*, an A/D converter 102, a frame dividing section 103, a fast Fourier transform (FFT) section 104, an object sound emphasis section 105, a noise estimation section 106, and a correction coefficient calculation section 107C. The sound inputting system 100C further includes correction coefficient changing sections 108 and 113, a post filtering section 109, an inverse fast Fourier transform (IFFT) section 110, a waveform synthesis section 111, an ambient noise state estimation section 112, and an object sound interval detection section 114.

Figure 29:
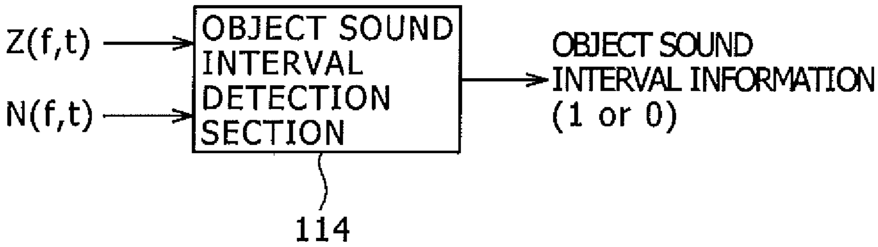
FIG. 29 is a block diagram showing an object sound detection section shown in FIG. 28.

The object sound interval detection section 114 detects an interval which includes object sound. In particular, the object sound interval detection section 114 decides based on an object sound estimation signal Z(f, t) produced by the object sound emphasis section 105 and a noise estimation signal N(f, t) produced by the noise estimation section 106 whether or not the current interval is an object sound interval for each frame as seen in FIG. 29 and then outputs object sound interval information.

The object sound interval detection section 114 determines an energy ratio between the object sound estimation signal Z(f, t) and the noise estimation signal N(f, t). The following expression (11) represents the energy ratio:

$$\sum_{f=0}^{f_s/2} \{Z(f,t)\}^2 \Big/ \sum_{f=0}^{f_s/2} \{N(f,t)\}^2 \qquad (11)$$

The object sound interval detection section 114 decides whether or not the energy ratio is higher than a threshold value therefor. Then, if the energy ratio is higher than the threshold value, then the object sound interval detection section 114 decides that the current interval is an object sound interval and outputs "1" as object sound interval detection information, but in any other case, the object sound interval detection section 114 decides that the current interval is not an object sound interval and outputs "0" as represented by the following expressions (12):

$$\begin{cases} 1: & \sum_{f=0}^{f_s/2} \{Z(f,t)\}^2 \Big/ \sum_{f=0}^{f_s/2} \{N(f,t)\}^2 > \text{threshold} \\ 0: & \text{otherwise} \end{cases} \qquad (12)$$

Figure 30:
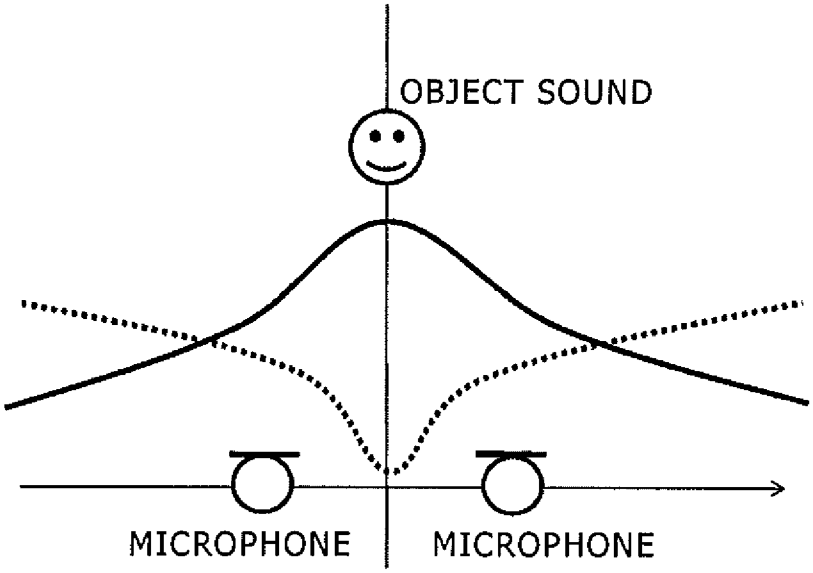
FIG. 30 is a view illustrating a principle of action of the object sound detection section of FIG. 29.
Figure 31:
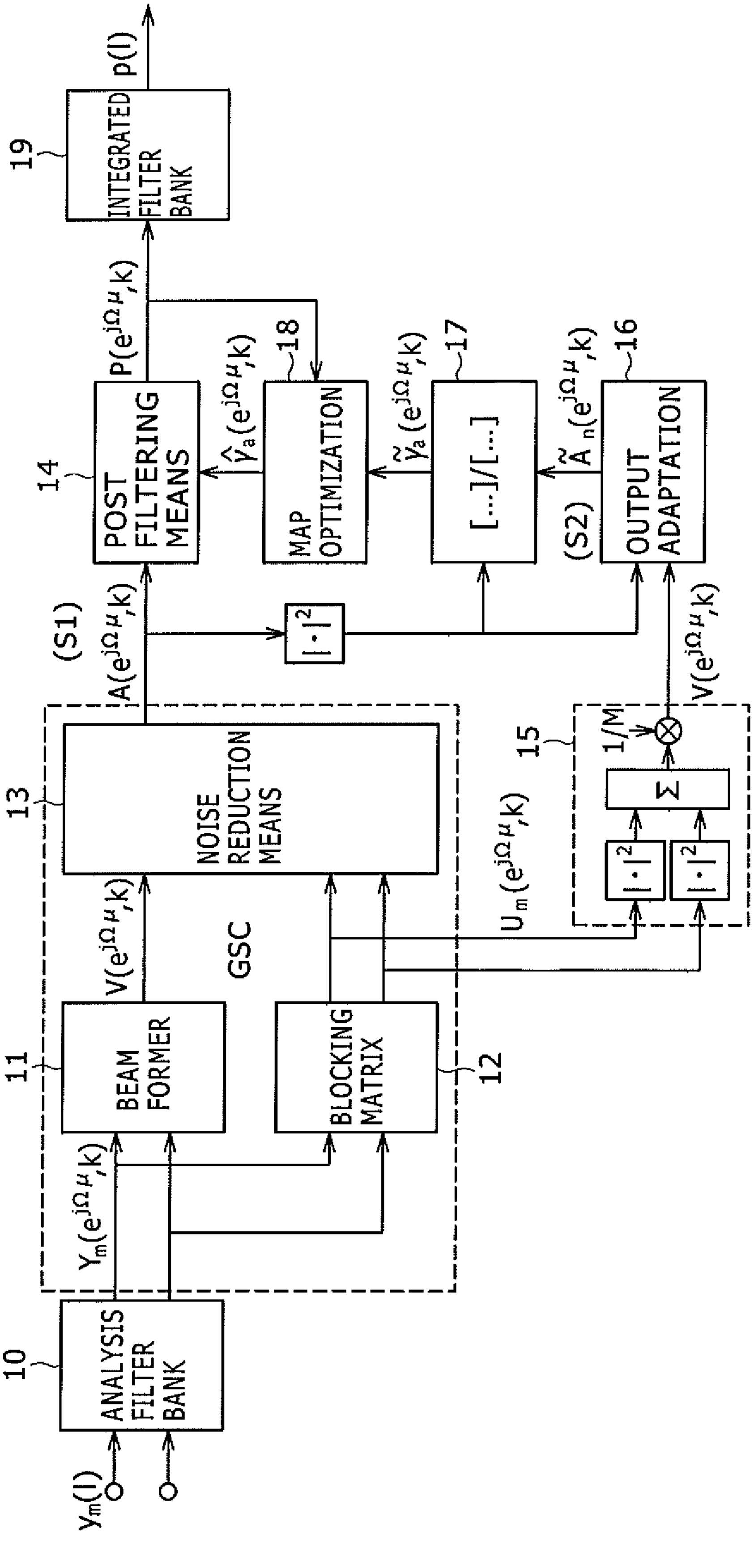
FIG. 31 is a block diagram showing an example of a configuration of a noise removing apparatus in the past.
Figure 32A:
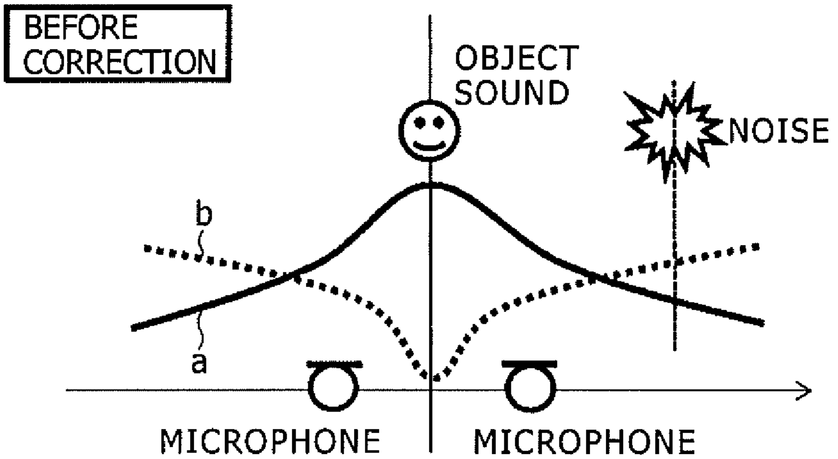
FIGS. 32A and 32B are diagrams illustrating an example of a directional characteristic for object sound emphasis and a directional characteristic for noise estimation before and after correction by the noise removing apparatus of FIG. 31.
Figure 32B:
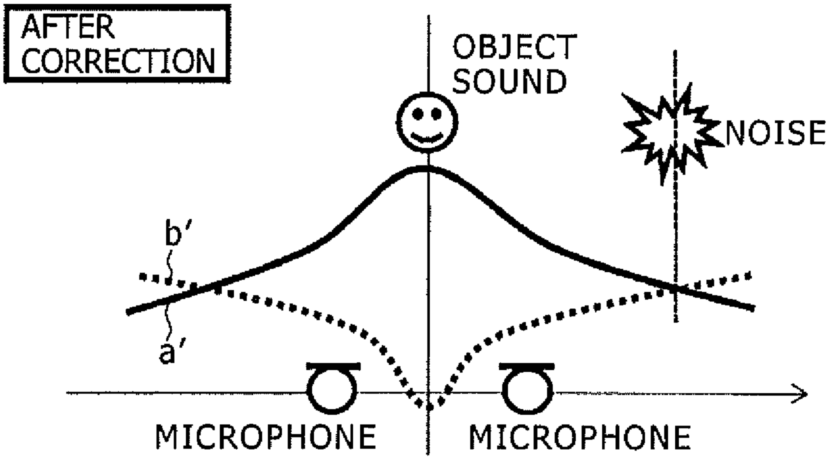
Figure 33:
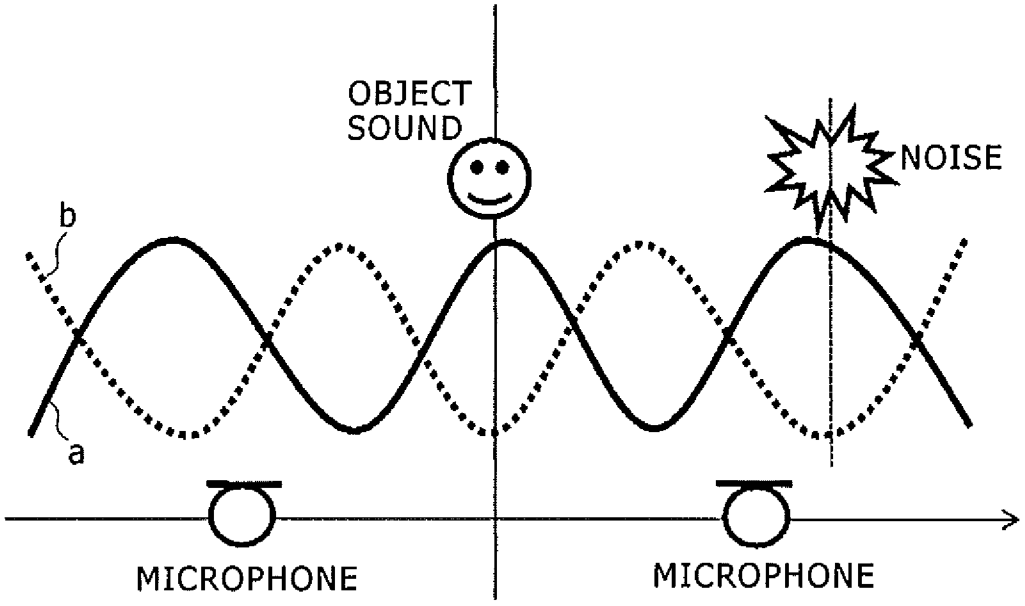
FIG. 33 is a diagram illustrating an example of a directional characteristic of a filter in the case where spatial aliasing occurs.
Figure 34:
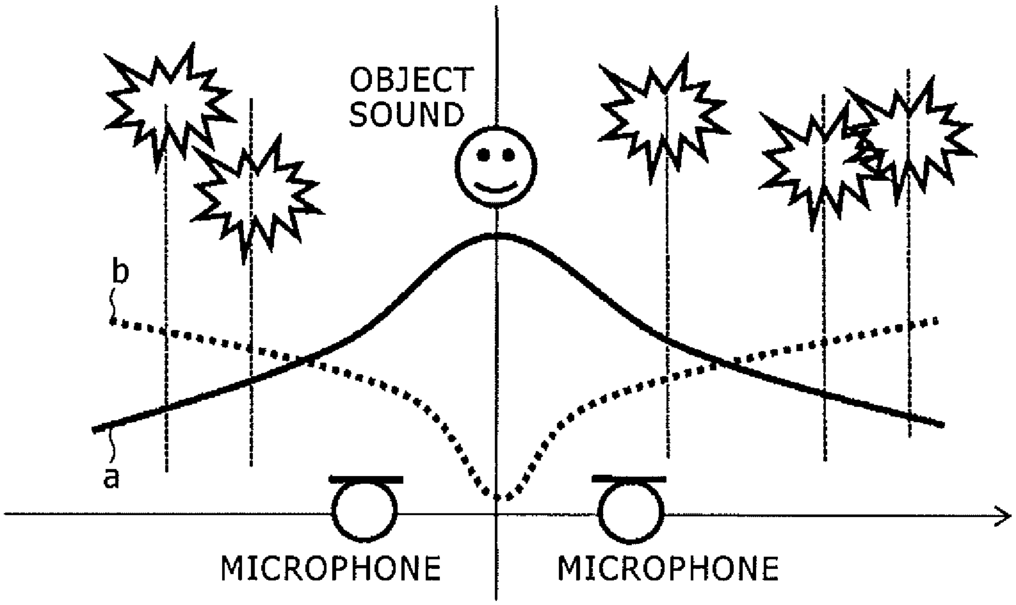
FIG. 34 is a diagram illustrating a situation in which a large number of noise sources exist around an object sound source.

In this instance, the fact is utilized that the object sound source is positioned on the front as seen in FIG. 30, and if object sound exists, then the difference between the gains of the object sound estimation signal Z(f, t) and the noise estimation signal N(f, t) is great, but if only noise exists, the difference between the gains is small. It is to be noted that similar processing can be applied also in the case where the microphone distance is known and the object sound source is not positioned on the front but is in an arbitrary position.

The correction coefficient calculation section 107C calculates correction coefficients β(f, t) similarly to the correction coefficient calculation section 107 of the sound inputting systems 100, 100A and 100B described hereinabove with reference to FIGS. 1, 16 and 26, respectively. However, different from the correction coefficient calculation section 107, the correction coefficient calculation section 107C decides whether or not correction coefficients β(f, t) should be calculated based on object sound interval information from the object sound interval detection section 114. In particular, in a frame in which no object sound exists, correction coefficients β(f, t) are calculated newly and outputted, but in any other frame, correction coefficients β(f, t) same as those in the immediately preceding frame are outputted as they are without calculating correction coefficients β(f, t).

Although detailed description is omitted herein, the other part of the sound inputting system 100C shown in FIG. 28 is configured similarly to that of the sound inputting system 100B described hereinabove with reference to FIG. 26 and operates similarly. Therefore, the sound inputting system 100C can achieve similar effects to those achieved by the sound inputting system 100B described hereinabove with reference to FIG. 26.

Further, in the present sound inputting system 100C, the correction coefficient calculation section 107 calculates correction coefficients β(f, t) within an interval within which no object sound exists. In this instance, since only noise components are included in the object sound estimation signal Z(f, t), correction coefficients β(f, t) can be calculated with a high degree of accuracy without being influenced by object sound. As a result, a good noise removing process is carried out.

5. Modifications

It is to be noted that, in the embodiments described above, the microphones 101*a* and 101*b* are noise canceling microphones installed in left and right headphone portions of a noise canceling headphone. However, the microphones 101*a* and 101*b* may otherwise be incorporated in a personal computer main body.

Also in the sound inputting systems 100 and 100A described hereinabove with reference to FIGS. 1 and 16, respectively, the object sound interval detection section 114 may be provided while the correction coefficient calculation section 107 carries out calculation of correction coefficients β(f, t) only in frames in which no object sound exists similarly as in the sound inputting system 100C described hereinabove with reference to FIG. 28.

The technique disclosed herein can be applied to a system where conversation can be carried out utilizing microphones for noise cancellation installed in a noise canceling headphone or microphones installed in a personal computer or the like.

It should be understood by those skilled in the art that various modifications, combinations, sub-combinations and alternations may occur depending on design requirements and other factors insofar as they are within the scope of the appended claims or the equivalent thereof.

What is claimed is:

1. A noise removing apparatus, comprising:

an object sound emphasis section adapted to carry out an object sound emphasis process for observation signals of first and second microphones disposed in a predetermined spaced relationship from each other to produce an object sound estimation signal;

a noise estimation section adapted to carry out a noise estimation process for the observation signals of said first and second microphones to produce a noise estimation signal;

a post filtering section adapted to remove noise components remaining in the object sound estimation signal produced by said object sound emphasis section by a post filtering process using the noise estimation signal produced by said noise estimation section;

a correction coefficient calculation section adapted to calculate, for each frequency, a correction coefficient for correcting the post filtering process to be carried out by said post filtering section based on the object sound estimation signal produced by said object sound emphasis section and the noise estimation signal produced by said noise estimation section; and a correction coefficient changing section adapted to change those of the correction coefficients calculated by said correction coefficient calculation section which belong to a frequency band which suffers from spatial aliasing such that a peak which appears at a particular frequency is suppressed.

2. The noise removing apparatus according to claim 1, wherein said correction coefficient changing section smoothes, in the frequency band which suffers from the spatial aliasing, the correction coefficients calculated by said correction coefficient calculation section in a frequency direction to produce changed correction coefficients for the frequencies.

3. The noise removing apparatus according to claim 1, wherein said correction coefficient changing section changes the correction coefficients for the frequencies in the frequency band which suffers from the spatial aliasing to 1.

4. The noise removing apparatus according to claim 1, further comprising an object sound interval detection section adapted to detect an interval within which object sound exists based on the object sound estimation signal produced by said object sound emphasis section and the noise estimation signal produced by said noise estimation section;

the calculation of correction coefficients being carried out within an interval within which no object sound exists based on object sound interval information produced by said object sound interval detection section.

5. The noise removing apparatus according to claim 4, wherein said object sound detection section determines an energy ratio between the object sound estimation signal and the noise estimation signal and, when the energy ratio is higher than a threshold value, decides that a current interval is an object sound interval.

6. The noise removing apparatus according to claim 1, wherein said correction coefficient calculation section uses an object sound estimation signal Z(f, t) and a noise estimation signal N(f, t) for a frame t of an fth frequency and a correction coefficient β(f, t−1) for a frame t−1 of the fth frequency to calculate a correction coefficient β(f, t) of the frame t of the fth frequency in accordance with an expression $$\beta(f,t) = \{\alpha \cdot \beta(f,t-1)\} + \left\{(1-\alpha) \cdot \frac{Z(f,t)}{N(f,t)}\right\}$$

where α is a smoothing coefficient.

7. A noise removing method, comprising:

carrying out an object sound emphasis process for observation signals of first and second microphones disposed in a predetermined spaced relationship from each other to produce an object sound estimation signal;

carrying out a noise estimation process for the observation signals of the first and second microphones to produce a noise estimation signal;

removing noise components remaining in the object sound estimation signal by a post filtering process using the noise estimation signal;

calculating, for each frequency, a correction coefficient for correcting the post filtering process to be carried out based on the object sound estimation signal and the noise estimation signal; and changing those of the correction coefficients which belong to a frequency band which suffers from spatial aliasing such that a peak which appears at a particular frequency is suppressed.

8. A noise removing apparatus, comprising:

an object sound emphasis section adapted to carry out an object sound emphasis process for observation signals of first and second microphones disposed in a predetermined spaced relationship from each other to produce an object sound estimation signal;

a noise estimation section adapted to carry out a noise estimation process for the observation signals of said first and second microphones to produce a noise estimation signal;

a post filtering section adapted to remove noise components remaining in the object sound estimation signal produced by said object sound emphasis section by a post filtering process using the noise estimation signal produced by said noise estimation section;

a correction coefficient calculation section adapted to calculate, for each frequency, a correction coefficient for correcting the post filtering process to be carried out by said post filtering section based on the object sound estimation signal produced by said object sound emphasis section and the noise estimation signal produced by said noise estimation section;

an ambient noise state estimation section adapted to process the observation signals of said first and second microphones to produce sound source number information of ambient noise; and a correction coefficient changing section adapted to smooth the correction coefficient calculated by said correction coefficient calculation section in a frame direction such that the number of smoothed frames increases as the number of sound sources increases based on the sound source number information of ambient noise produced by said ambient noise state estimation section to produce changed correction coefficients for the frames.

9. The noise removing apparatus according to claim 8, wherein said ambient noise state estimation section calculates a correlation coefficient of the observation signals of said first and second microphones and uses the calculated correlation coefficient as the sound source number information of ambient noise.

10. The noise removing apparatus according to claim 8, further comprising an object sound interval detection section adapted to detect an interval within which object sound exists based on the object sound estimation signal produced by said object sound emphasis section and the noise estimation signal produced by said noise estimation section;

the correction coefficient calculation section carrying out the calculation of correction coefficients within an interval within which no object sound exists based on object sound interval information produced by said object sound interval detection section.

11. The noise removing apparatus according to claim 10, wherein said object sound detection section determines an energy ratio between the object sound estimation signal and the noise estimation signal and, when the energy ratio is higher than a threshold value, decides that a current interval is an object sound interval.

12. The noise removing apparatus according to claim 8, wherein said correction coefficient calculation section uses an object sound estimation signal Z(f, t) and a noise estimation signal N(f, t) for a frame t of an fth frequency and a correction coefficient β(f, t−1) for a frame t−1 of the fth frequency to calculate a correction coefficient β(f, t) of the frame t of the fth frequency in accordance with an expression $$\beta(f,t) = \{\alpha \cdot \beta(f,t-1)\} + \left\{(1-\alpha) \cdot \frac{Z(f,t)}{N(f,t)}\right\}$$

where α is a smoothing coefficient.

13. A noise removing method, comprising:

carrying out an object sound emphasis process for observation signals of first and second microphones disposed in a predetermined spaced relationship from each other to produce an object sound estimation signal;

carrying out a noise estimation process for the observation signals of the first and second microphones to produce a noise estimation signal;

removing noise components remaining in the object sound estimation signal by a post filtering process using the noise estimation signal;

calculating, for each frequency, a correction coefficient for correcting the post filtering process to be carried out based on the object sound estimation signal and the noise estimation signal;

processing the observation signals of the first and second microphones to produce sound source number information of ambient noise; and smoothing the correction coefficient in a frame direction such that the number of smoothed frames increases as the number of sound sources increases based on the sound source number information of ambient noise to produce changed correction coefficients for the frames.

14. A noise removing apparatus, comprising:

an object sound emphasis section adapted to carry out an object sound emphasis process for observation signals of first and second microphones disposed in a predetermined spaced relationship from each other to produce an object sound estimation signal;

a noise estimation section adapted to carry out a noise estimation process for the observation signals of said first and second microphones to produce a noise estimation signal;

a post filtering section adapted to remove noise components remaining in the object sound estimation signal produced by said object sound emphasis section by a post filtering process using the noise estimation signal produced by said noise estimation section;

a correction coefficient calculation section adapted to calculate, for each frequency, a correction coefficient for correcting the post filtering process to be carried out by said post filtering section based on the object sound estimation signal produced by said object sound emphasis section and the noise estimation signal produced by said noise estimation section;

a first correction coefficient changing section adapted to change those of the correction coefficients calculated by said correction coefficient calculation section which belong to a frequency band which suffers from spatial aliasing such that a peak which appears at a particular frequency is suppressed;

an ambient noise state estimation section adapted to process the observation signals of said first and second microphones to produce sound source number information of ambient noise; and a second correction coefficient changing section adapted to smooth the correction coefficient calculated by said correction coefficient calculation section in a frame direction such that the number of smoothed frames increases as the number of sound sources increases based on the sound source number information of ambient noise produced by said ambient noise state estimation section to produce changed correction coefficients for the frames.

15. The noise removing apparatus according to claim 14, wherein said correction coefficient changing section smoothes, in the frequency band which suffers from the spatial aliasing, the correction coefficients calculated by said correction coefficient calculation section in a frequency direction to produce changed correction coefficients for the frequencies.

16. The noise removing apparatus according to claim 14, wherein said correction coefficient changing section changes the correction coefficients for the frequencies in the frequency band which suffers from the spatial aliasing to 1.

17. The noise removing apparatus according to claim 14, wherein said ambient noise state estimation section calculates a correlation coefficient of the observation signals of said first and second microphones and uses the calculated correlation coefficient as the sound source number information of ambient noise.

18. The noise removing apparatus according to claim 14, further comprising an object sound interval detection section adapted to detect an interval within which object sound exists based on the object sound estimation signal produced by said object sound emphasis section and the noise estimation signal produced by said noise estimation section;

the correction coefficient calculation section carrying out the calculation of correction coefficients within an interval within which no object sound exists based on object sound interval information produced by said object sound interval detection section.

19. The noise removing apparatus according to claim 18, wherein said object sound detection section determines an energy ratio between the object sound estimation signal and the noise estimation signal and, when the energy ratio is higher than a threshold value, decides that a current interval is an object sound interval.

20. The noise removing apparatus according to claim 14, wherein said correction coefficient calculation section uses an object sound estimation signal Z(f, t) and a noise estimation signal N(f, t) for a frame t of an fth frequency and a correction coefficient β(f, t−1) for a frame t−1 of the fth frequency to calculate a correction coefficient β(f, t) of the frame t of the fth frequency in accordance with an expression $$\beta(f,t) = \{\alpha \cdot \beta(f,t-1)\} + \left\{(1-\alpha) \cdot \frac{Z(f,t)}{N(f,t)}\right\}$$

where α is a smoothing coefficient.

* * * * *